US012567919B2

(12) United States Patent
Biederman et al.

(10) Patent No.: US 12,567,919 B2
(45) Date of Patent: Mar. 3, 2026

(54) OPTICAL AND ELECTRICAL MODULES WITH ENHANCED FEATURES

(71) Applicant: Intel Corporation, Santa Clara, CA (US)

(72) Inventors: Daniel Christian Biederman, Saratoga, CA (US); Pat Wang, San Jose, CA (US); Mark Bordogna, Andover, MA (US); Raghuram Narayan, Newark, CA (US); Renuka Sapkal, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 875 days.

(21) Appl. No.: 17/668,265

(22) Filed: Feb. 9, 2022

(65) Prior Publication Data

US 2022/0271855 A1    Aug. 25, 2022

(51) Int. Cl.
*H04J 3/06*        (2006.01)
*H04J 14/08*       (2006.01)

(52) U.S. Cl.
CPC ............ *H04J 3/0697* (2013.01); *H04J 14/08* (2013.01)

(58) Field of Classification Search
None
See application file for complete search history.

(56) References Cited

U.S. PATENT DOCUMENTS 9,584,217 B2 * 2/2017 Bottari ................... H04J 3/0697
9,769,047 B2 * 9/2017 Tzeng .................... H04L 1/0061

10,313,103 B1 * 6/2019 Perras ................... H04B 10/516
10,931,391 B2 * 2/2021 Mallela .................. H04J 3/0667
11,281,250 B2 * 3/2022 Horn ......................... G06F 1/04
11,552,722 B2 * 1/2023 Gareau .................. H04J 3/1652
11,606,156 B1 * 3/2023 Duda .................... H04J 3/0697
11,677,487 B2 * 6/2023 Demchenko ............ H04L 47/28
                                                            370/503

(Continued)

OTHER PUBLICATIONS

Pan et al., High resolution distributed time-to-digital converter (TDC) in a White Rabbit network, Elsevier, 2013 (Year: 2013).*

(Continued)

*Primary Examiner* — Jai M Lee

(74) *Attorney, Agent, or Firm* — Compass IP Law PC

(57) ABSTRACT

Optical and electrical modules with enhanced features and associated apparatus and methods. The optical modules are configured to implement one or more features that are offloaded from Ethernet devices to which the optical modules are configured to be attached. The features include support for timestamping packets and preamble using IEEE 1588 Precision Time Protocol (PTP) profiles, support for implementing IEEE 1588 one-step operations, support for implementing IEEE 1588 Ethernet Synchronous Clocks (SyncE) profiles, support for In-Band Network Telemetry (INT), and support for implementing a MACsec security protocol defined by IEEE standard 802.1AD. The enhanced features provided by the optical modules enable Ethernet devices to be upgraded to support the enhanced features by replacing conventional optical modules with the optical modules disclosed herein. Support for White Rabbit IEEE PTP and SyncE profiles is also provided.

17 Claims, 18 Drawing Sheets

(56)    References Cited

U.S. PATENT DOCUMENTS

| | | | | |
|---|---|---|---|---|
| 11,824,636 | B2 * | 11/2023 | He | H04J 3/0691 |
| 11,831,403 | B2 * | 11/2023 | Lee | H04J 3/0667 |
| 11,876,884 | B2 * | 1/2024 | Qi | H04B 10/40 |
| 12,133,185 | B2 * | 10/2024 | Liu | H04W 56/0015 |
| 12,160,308 | B2 * | 12/2024 | Wang | H04B 10/07955 |
| 12,184,406 | B2 * | 12/2024 | Li | H04W 56/001 |
| 12,206,752 | B2 * | 1/2025 | Sarda | H04L 63/0428 |
| 12,250,067 | B2 * | 3/2025 | Budnik | H04J 3/067 |
| 2014/0226683 | A1 * | 8/2014 | Castiel | H04L 12/64 |
| | | | | 370/474 |
| 2022/0271855 | A1 * | 8/2022 | Biederman | H04J 14/08 |
| 2024/0080122 | A1 * | 3/2024 | Lyu | H04J 3/0688 |
| 2024/0162999 | A1 * | 5/2024 | Bedrosian | H04L 43/0864 |
| 2024/0204899 | A1 * | 6/2024 | Bordogna | H04J 3/0667 |
| 2024/0204982 | A1 * | 6/2024 | Dror | H04L 7/0033 |

OTHER PUBLICATIONS

Nagasamudram, Spoorthi, Implementation of the IEEE 1588 Precision Time Protocol for Clock Synchronization in the Radio Detection of Ultra-High Energy Neutrinos, Undergraduate Research Thesis, The Ohio State University, 2018 (Year: 2018).*

* cited by examiner

OPTICAL AND ELECTRICAL MODULES WITH ENHANCED FEATURES

BACKGROUND INFORMATION

Computer networks span the range for Local Area Network (LANs) to Wide Area Networks (WANs), to collections of interconnected networks (such as the Internet). The build-out of these networks includes a mixture of switches and networking equipment such a network interface controllers (NICs), some with more recent advancements and features, while others are older and have limited features. In some instances, it is desired to add features to such older switches and networking equipment. Some of these features include Re-timers, In-band Network Telemetry (INT), Precise Time features, and security features.

CERN's "White Rabbit" was designed for high precision and accuracy. In some cases, the precision and/or accuracy are in the single digit picosecond or less (e.g., femtoseconds). Some of these concepts are included in IEEE 1588-2019 (Institute of Electrical Engineers and Electronics Standard for a Precision Clock Synchronization Protocol for Networked Measurement and Control Systems) as a profile, such as Ethernet Synchronous Clocks (SyncE).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
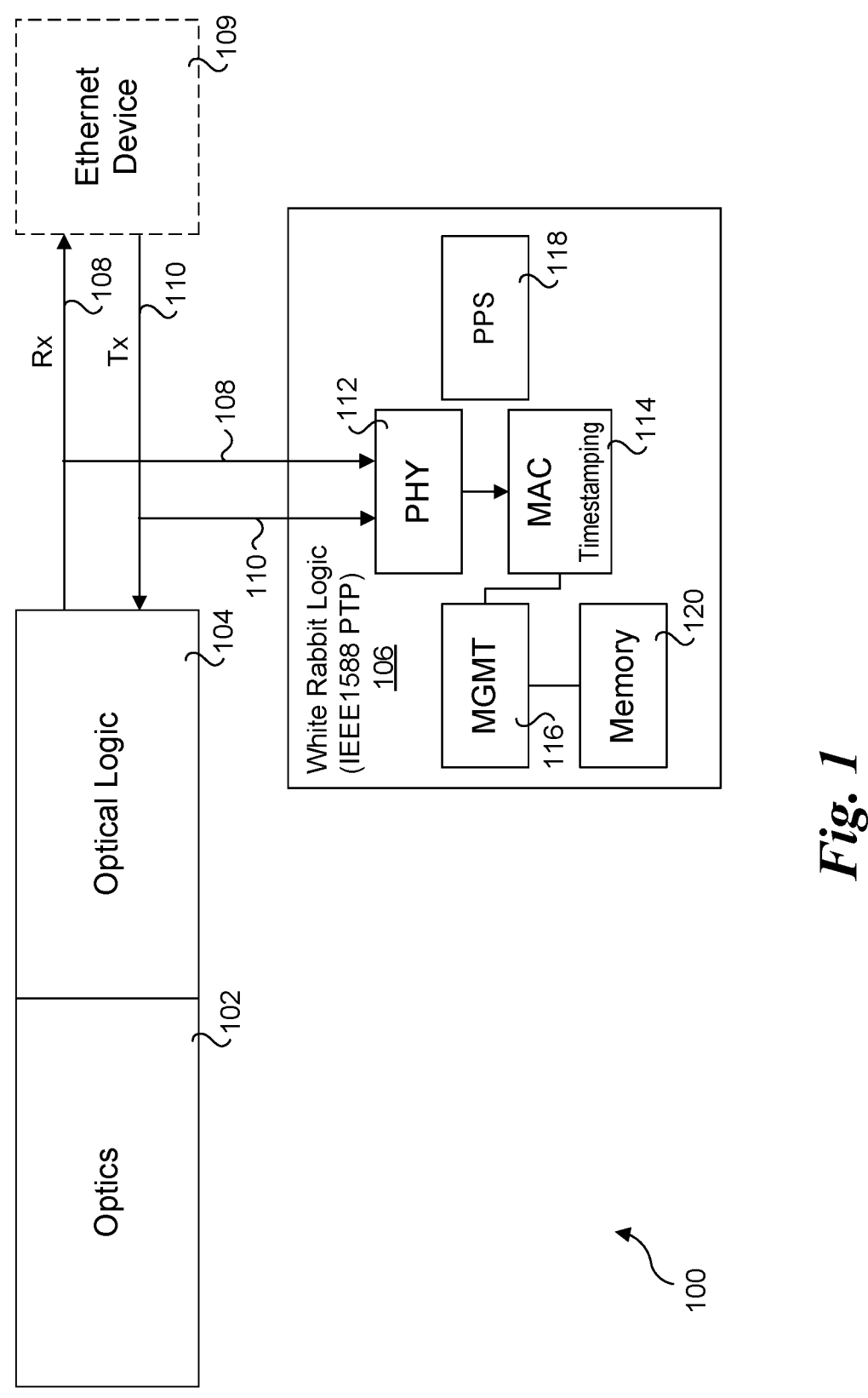
FIG. 1 is a diagram of an optical module configured to support the White Rabbit IEEE 1588 PTP profile, according to one embodiment.

Embodiments of optical modules with enhanced features and associated apparatus and methods are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, circuitry and logic are added to and/or modified in networking modules, such as optical modules to support extended functionality and features. The optical modules are configured to implement one or more features that are offloaded from Ethernet devices to which the optical modules are configured to be attached. The features include support for timestamping packets and/or preambles using IEEE 1588 Precision Time Protocol (PTP) profiles, support for implementing IEEE 1588 one-step operations, support for implementing IEEE 1588 Ethernet Synchronous Clocks (SyncE) profiles, support for In-Band Network Telemetry (INT), and support for implementing a MACsec security protocol defined by IEEE standard 802.1AD. In some embodiments, White Rabbit IEEE PTP and SyncE profiles are supported. The enhanced features provided by the optical modules enable Ethernet devices to be upgraded to support the enhanced features by replacing conventional optical modules with the optical modules described and illustrated herein.

In addition to optical modules, the principles and teachings may be applied to wired networking modules such as used for Ethernet. For example, copper or metal Ethernet connections are common in 1G, 10G and 25G. Likewise, a 10G or 25G device could use pluggable devices that receive and transmit optical or electrical signals. Hence the concepts in this application should not be limited to optical or optical pluggable devices, but may be implemented in electrical modules such as the pluggable electrical modules described and illustrated herein.

Optical Module with IEEE 1588 PTP Support

FIG. 1 shows circuitry for an optical module 100 the supports IEEE 1588 Precision Time Protocol (PTP), according to one embodiment. Optical module 100 includes an optics block 102, an optical logic block 104, and a White Rabbit logic block 106. Generally, optical block 102 and optical logic block 104 may comprise conventional blocks in optical modules (noting that the optical logic blocks may be modified/augmented to support the features described herein in some embodiments). They are used to process inbound received signals (received at an input port from a network) that are processed and forwarded along a receive (Rx) path 108 to an Ethernet device 109 and outbound signals originating from Ethernet device 109 that are received by optical logic 104 and forwarded and processed along a transmit (Tx) path 110. In some embodiments, optics block 102 and optical logic block 104 are configured to facilitate communication using optical signals in accordance with one or more Ethernet standards. Example Ethernet standards include but are not limited to the following IEEE standards and proposals: 802.3bs, 802.3bm, 802.3by, 802.3ca, 802.3cp, 802.3cs, and 802.3df.

White Rabbit is a sub-nanosecond synchronization technology that uses IEEE 1588 Precision Time Protocol (PTP) and (optionally) Ethernet Synchronous Clocks (SyncE).

There are White Rabbit profiles included in the IEEE1588-2019 Standard that include IEEE 1588 PTP and IEEE 1588+SyncE. The IEEE 1588 PTP profile is implemented in White Rabbit logic block 106 using circuitry and logic comprising a PHY (Physical Layer) block 112, a MAC block 114 with timestamping, a management unit 116, and a Pulse Per Second (PPS) block 118. Management unit 116 is coupled to MAC block 114 and memory 120. In one embodiment, the circuitry and logic illustrated in White Rabbit logic block 106 is implemented in optical logic block 104.

PPS logic in PPS block 118 is used, in part, to determine the current precise time. It may include a pulse per second pin, a 10 KHz pin, or some other sync signal. It may also include a reference clock to allow for the best accuracy.

The circuitry and logic implemented in White Rabbit logic block 106 may comprise some form of embedded logic (such as a Field Programmable Gate Array (FPGA) or other programmable logic, an Application Specific Integrated Circuit (ASIC), or a structure ASIC (e.g., an Intel® eASIC™) or a combination thereof that can synchronize its clock to an incoming sync signal or signals such as a 1 Pulse Per Second, a 10 KHz clock, and/or a recovered external clock. White Rabbit logic block 106 is further configured to employ this circuitry and logic to timestamp arriving and departing packets, and to perform associated timing measurements. The timestamps for arriving and departing packets may be sent to external circuitry (not shown) through an MDIO interface or management interface of optical module 100. In one embodiment a mechanism is used to identify which packets need to be time stamped, as not every packet arrival and departure time needs to be known.

As shown in FIG. 1, White Rabbit logic block 106 "listens" to both the receive and transmit paths 108 and 110. PHY block 112 (e.g., PCS Physical Coding Sublayer (PCS) and Forward Error Correction (FEC) sublayer in the PHY) and MAC block 114 are configured to enable timestamping of received and transmitted packets. In one embodiment, the packets have a simple parser to determine which packets need to be timestamped. Details of those packets and their arrival or departure time are stored in memory 120 for retrieval using the management unit 116.

Figure 1A:
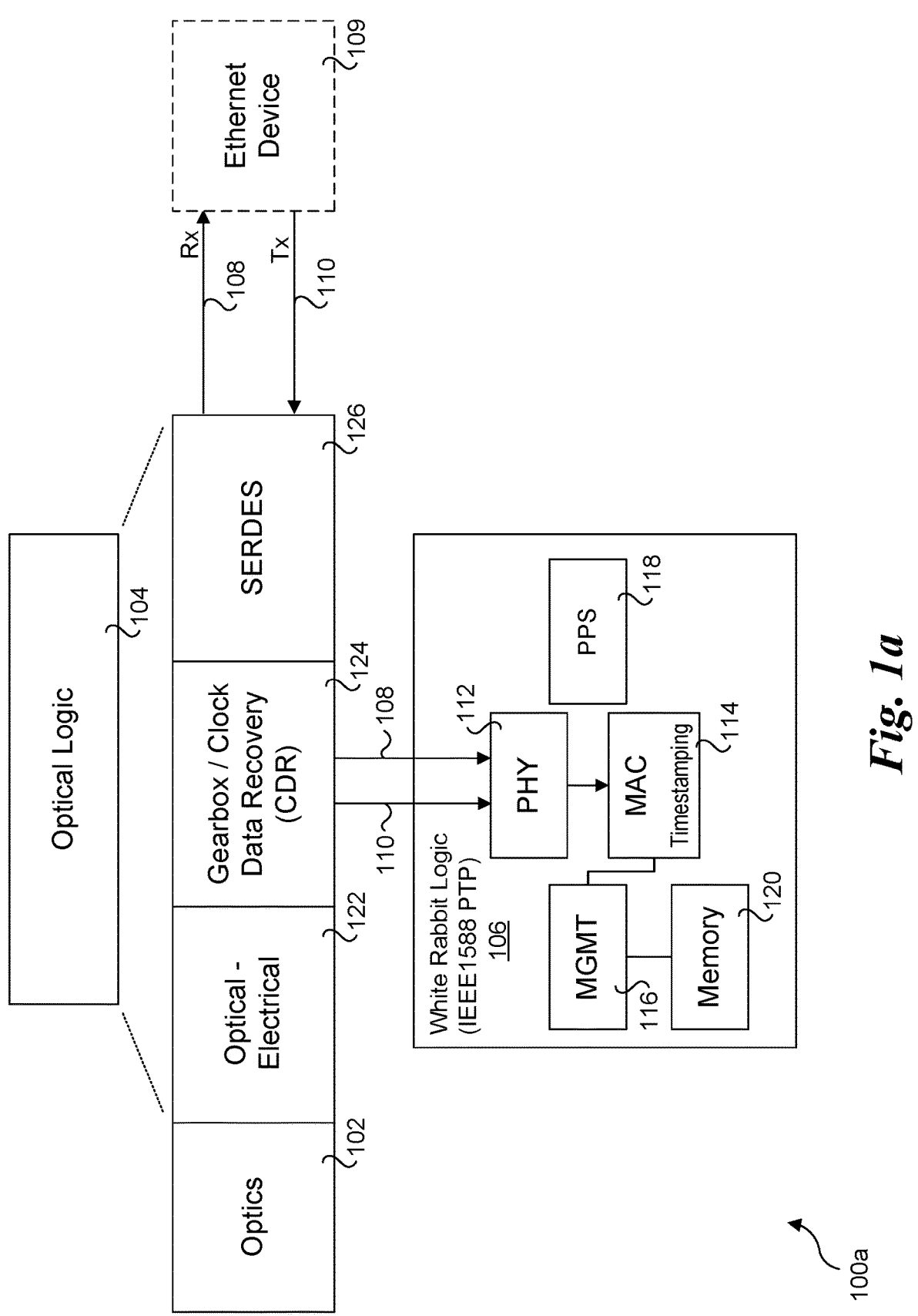
FIG. 1a is a diagram illustrating further details of the optical logic block of FIG. 1 along with listening of the signals as they are passed through the gearbox/CDR block.

FIG. 1a shows an optical module 100a illustrating a variant of optical module 100a under which listening of signal occurs within optical logic 104. FIG. 1a also show further details of optical logic 104, which includes an optical-electrical block 122, a gearbox/clock data recovery (CDR) block 124, and a SERDES (serializer/deserializer) block 126.

Optical-electrical block 122 includes circuitry that converts signals between an optical domain and an electrical domain. Optics block 102 is configured to receive and transmit optical signals in accordance with one or more optical network standards. On the receive side, these signals are converted to an electrical domain by circuitry and physical components in optical-electrical block 122. On the transmit side, electrical signals are converted to optical signals by optical-electrical block 122. In some embodiments optics block 102 and optical-electrical block 122 are combined or otherwise their functionality is effectively combined. The operations and structure of optics block 102 and optical-electrical block 122 are generally known in the art and outside the scope of this disclosure.

Gearbox/CDR block 124 is used to perform clock data recovery. The "gearbox" aspect also may be used to change the data rate used for some of the electrical circuitry such that the data rate is different than the line rate used by the optical network. The operations and structure of Gearbox/ CDR block 124 are generally known in the art, except for the modified versions described and illustrated herein.

SERDES block 126 is used to serialize and deserialize signals forwarded to and received from Ethernet device 109. Depending on the communication standard used, the signal may employ one or more "lanes." The circuitry used in SERDES block 126 are generally known in the art and are outside the scope of this disclosure.

As further shown in FIG. 1*a*, signals along Rx path 108 and Tx path 110 are listened to and processed by circuitry in White Rabbit logic block 106 in a manner similar to that described above in FIG. 1. The primary difference between the embodiments shown in FIGS. 1 and 1*a* are where the signals are listened to. It is further noted that optical logic block 104 in FIG. 1 may comprise the same or similar circuitry to that illustrated in FIG. 1*a*.

Optical Module with IEEE 1588 PTP+SyncE

Figure 2:
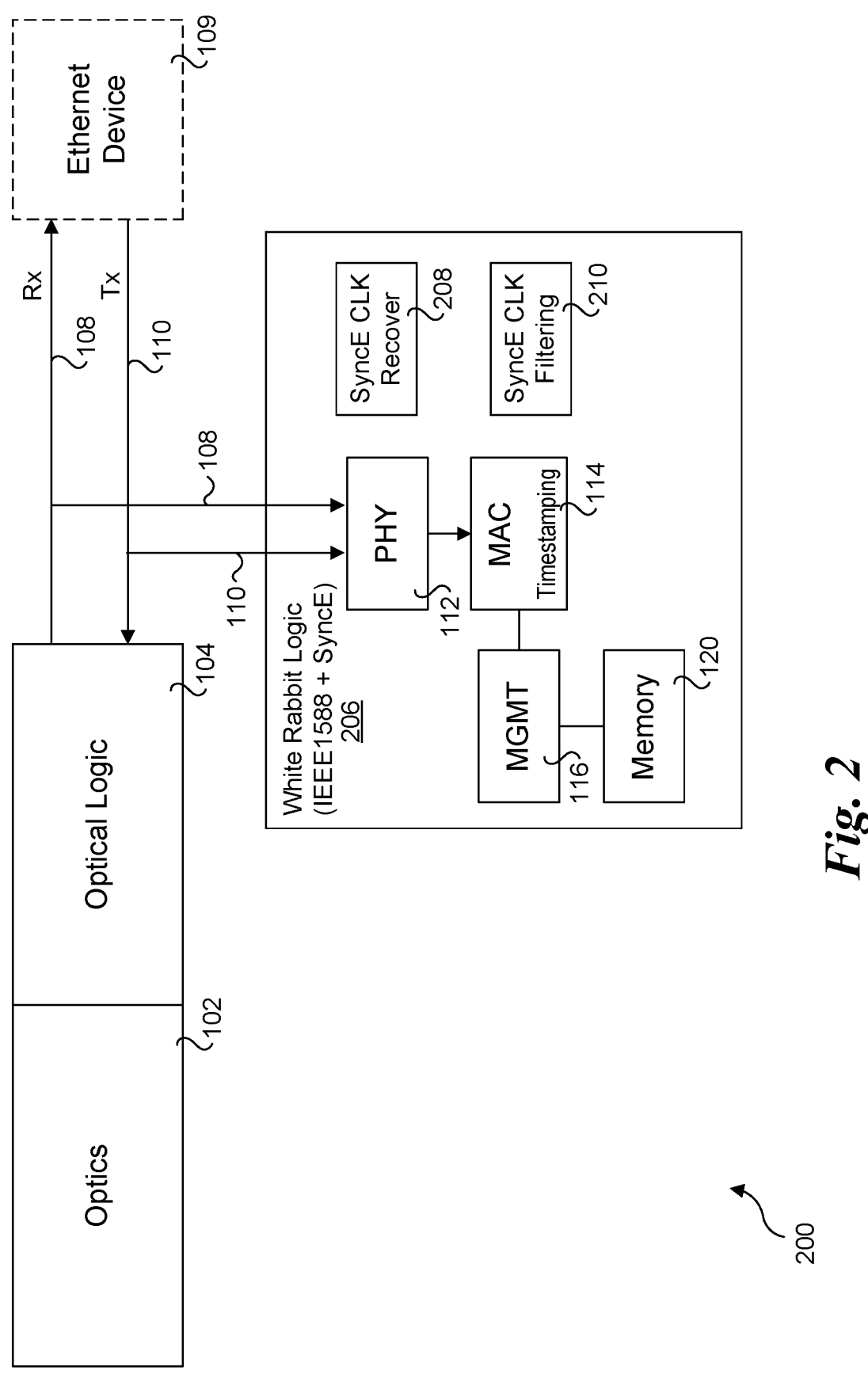
FIG. 2 is a diagram of an optical module configured to support the White Rabbit IEEE 1588 PTP profile plus provide SyncE support, according to a first embodiment.
Figure 2A:
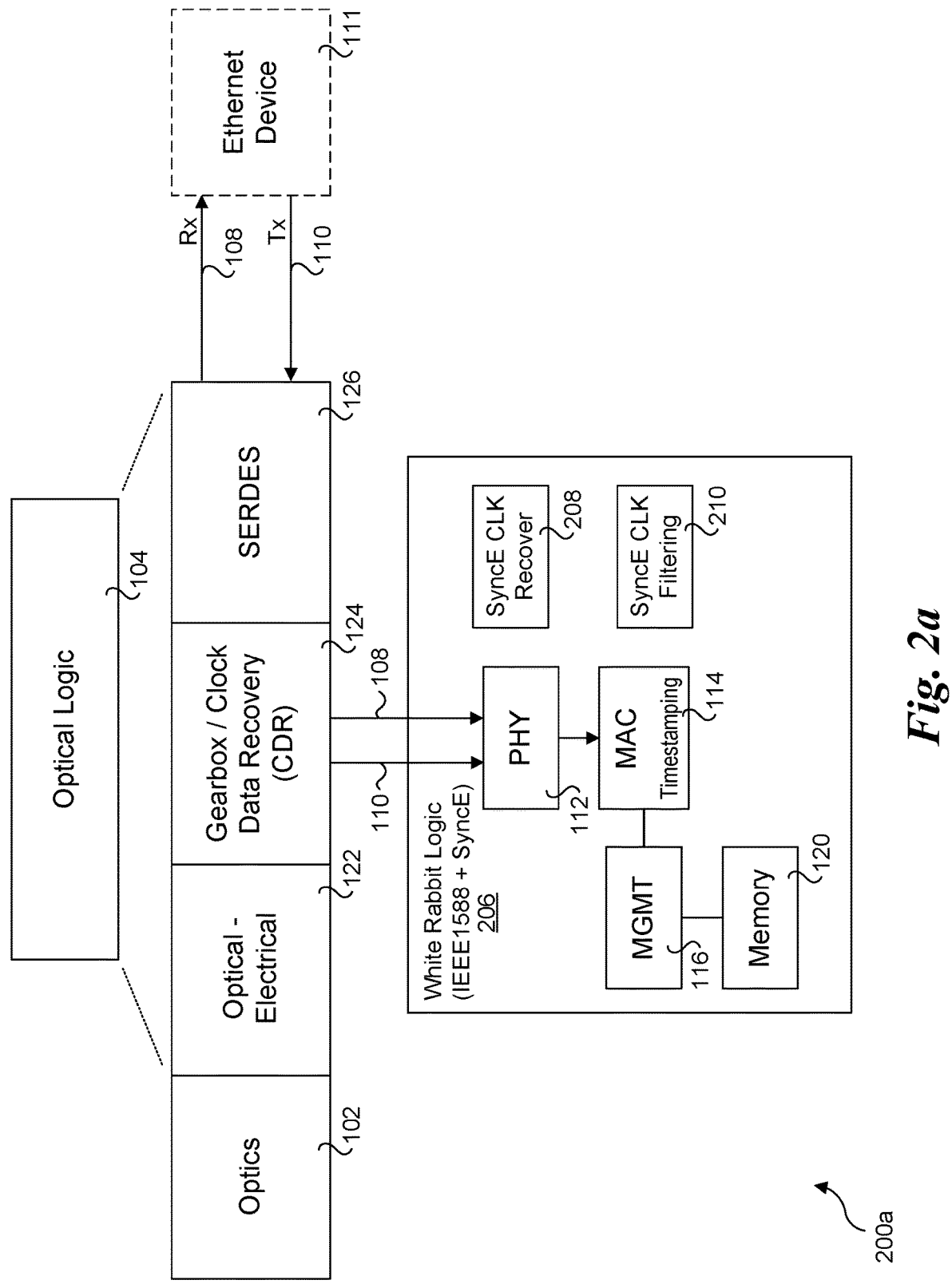
FIG. 2a is a diagram illustrating further details of the optical logic block of FIG. 2 along with listening of the signals as they are passed through the gearbox/CDR block.

FIGS. 2 and 2*a* respectively show optical modules 200 and 200*a* which include a White Rabbit logic block 206 that is configured to implement IEEE 1588 PTP and SyncE according to a White Rabbit profile in the IEEE1588-2019 standard. In FIGS. 1, 1*a*, 2 and 2*a*, components and blocks with like-numbered references perform similar functions. For optical module 200, these components and blocks include optics block 102, optical logic 104, PHY block 112, MAC block 114, management unit 116 and memory 120. As before, signals are forward to and received from Ethernet device 109 using Rx path 108 and Tx path 110.

White Rabbit logic block 206 further includes a SyncE clock (CLK) recover block 208 and an SyncE clock filtering block 210. The SyncE clock recovery block 208 and SyncE clock filtering block 210 recovers and cleans up the recovered clock and outputs the recovered clock to the rest of the system. In one embodiment, SyncE recovered clock block 208 is also used by the internal logic of optical module 200. For example, the recovered clock could be used as the receive clock associated with the receive data. As another option, another optical module could recover the clock and share it with this module, where this module uses it for its IEEE 1588 related logic.

Under the embodiment of optical module 200*a* shown in FIG. 2*a*, optical logic 104 has a similar structure and circuitry to that shown in FIG. 1*a* and discussed above. Also as above, in this embodiment the listening by circuitry in White Rabbit logic block 206 is performed within Gearbox/ CDR block 124.

Optical Module with IEEE 1588 One-Step Support

IEEE 1588 supports one-step and two-step clocks. Under one-step, for a PTP event message the timestamp is placed in the message/packet on-the-fly using hardware. Under two-step, the timestamp is added to a separate message/ packet. The following embodiments add support for IEEE 1588 one-step.

Figures 3A, 3B:
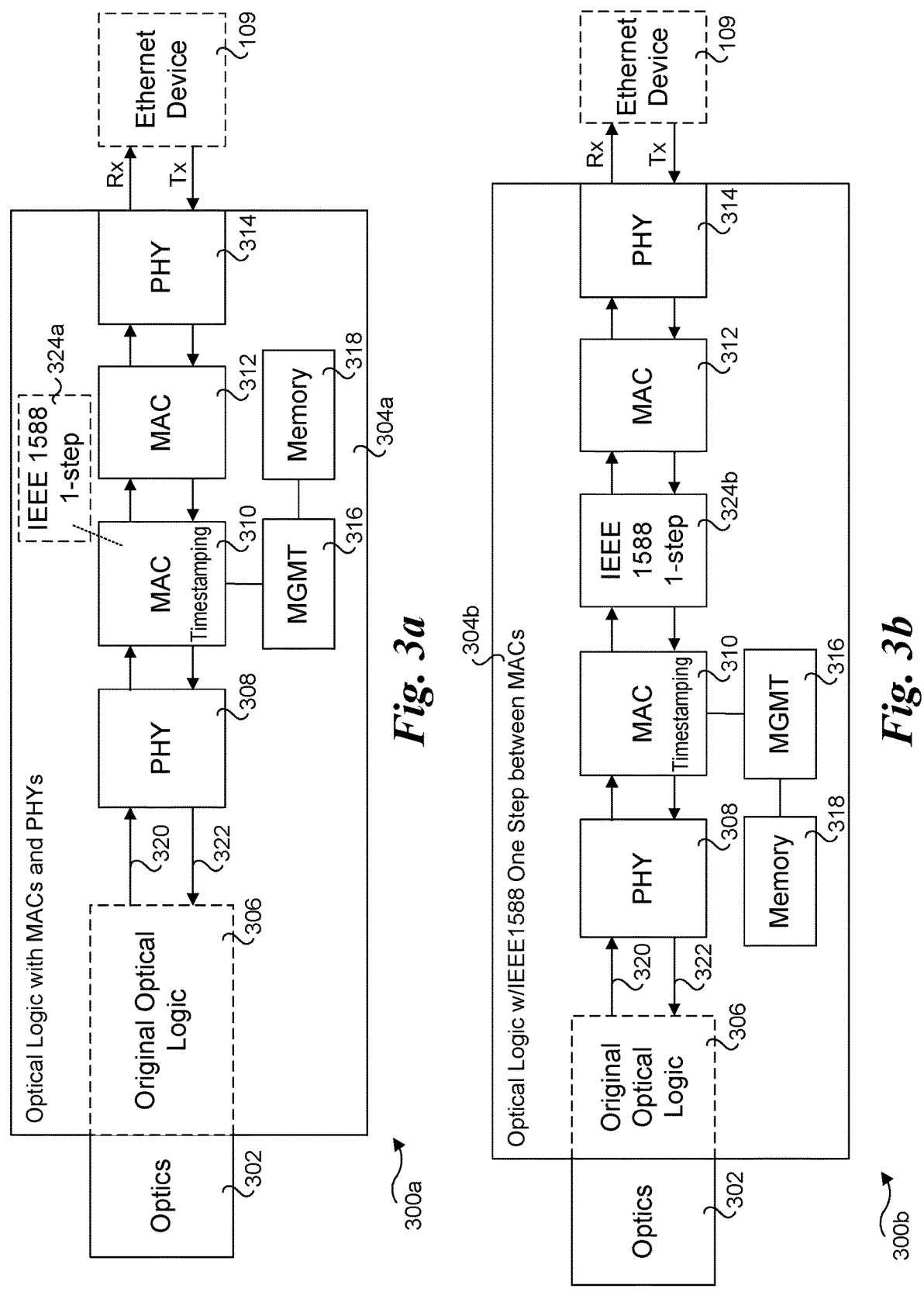
FIG. 3a is a diagram illustrating a first embodiment of an optical module including optical logic for implement IEEE 1588 one-step operations.
FIG. 3b is a diagram illustrating a second embodiment of an optical module including optical logic for implement IEEE 1588 one-step operations.

FIG. 3*a* shows an optical module 300*a* including an optics block 302 and an optical logic block 304*a* with two MACs and two PHYs. Optical logic block 304*a* includes an original optical logic block 306 (e.g., a conventional optical logic block used in today's optical modules), a first PHY block 308, a first MAC block 310 with timestamping, a second MAC block 312, a second PHY block 314, a management unit 316, and memory 318. The receive path 320 is from original optical logic 306 to first PHY block 308 to first MAC block 310 to second MAC block 312 to second PHY block 314. The transmit path 322 is from second PHY block 314 to second MAC block 312 to first MAC block 310 to first PHY block 308 to original optical logic 306. As packets traverse receive path 320 and transmit path 322 a timestamp may be added (for all or selected packets) in MAC block 310. Optionally, timestamping may be added elsewhere along the receive and transmit paths.

Under one implementation of optical module 300*a*, a timestamp is added by MAC block 312 to the preamble going to Ethernet device 109 such that the preamble contains the arrival time of each packet, allowing the Ethernet device to know the exact arrival time of each packet. Likewise details about the packet transmission could be sent in the preamble (like timestamp this packet and/or insert a timestamp at a location for an IEEE1588 1-step departing packet). Under one embodiment, MAC block 312 includes IEEE 1588 one-step logic 324*a*.

FIG. 3*b* shows an optical module 300*b* including optical logic block 304*b* that supports IEEE 1588 one-step. As shown, an IEEE 1588 one-step block 324*b* is interposed between MAC blocks 310 and 312. IEEE 1588 one-step block 324*b* is configured to perform timestamping and associated IEEE 1588 one-step operations.

Optical Modules with IEEE 1588+SyncE+INT Support

Figures 4A, 4B:
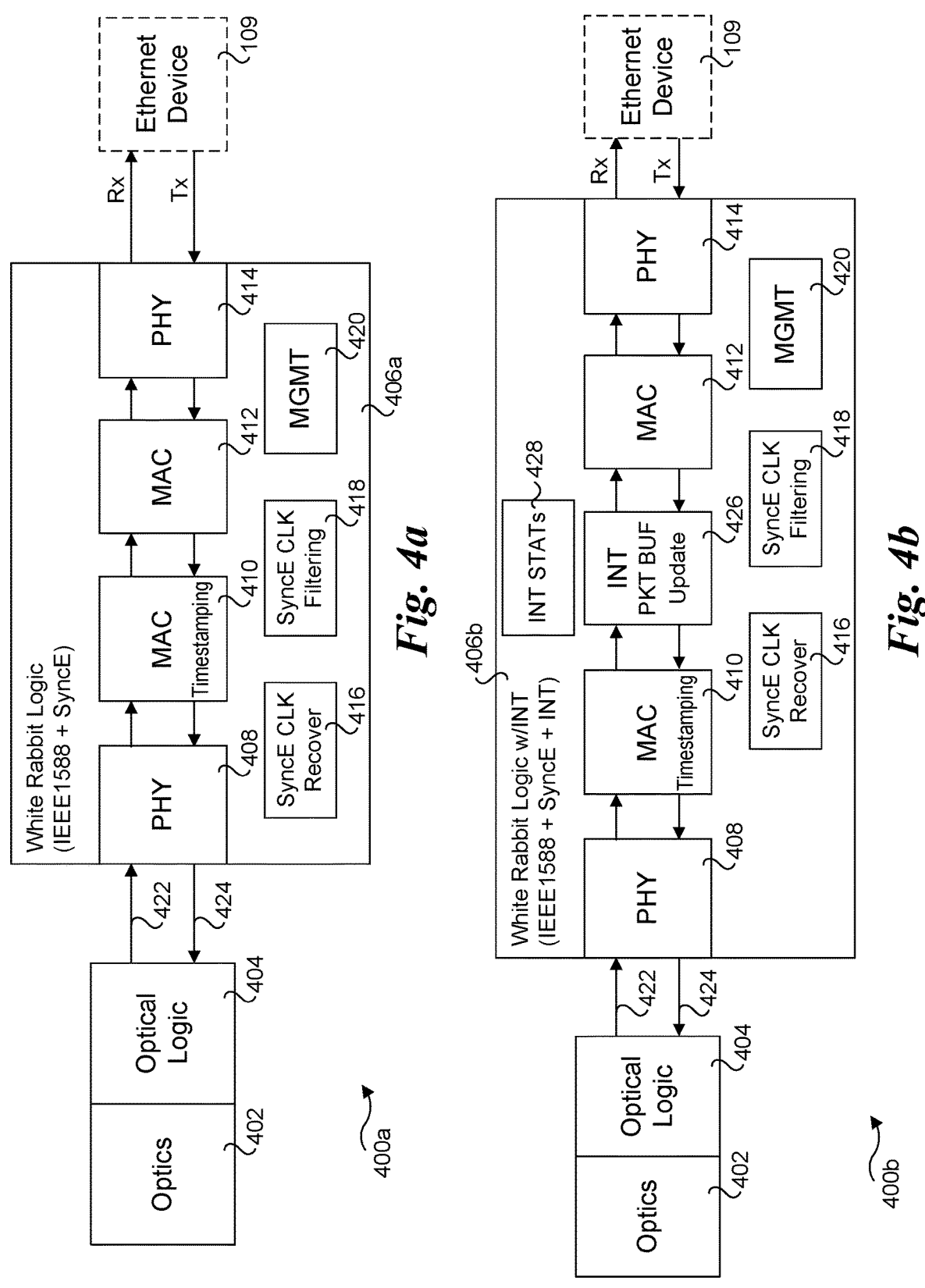
FIG. 4a is a diagram illustrating an optical module configured to support the White Rabbit IEEE 1588 PTP profile plus provide SyncE support, according to a second embodiment.
FIG. 4b is a diagram illustrating an optical module configured to support IEEE 1588 plus SyncE plus further includes support for In-Band Network Telemetry (INT), according to one embodiment.

FIG. 4*a* shows an embodiment of an optical module 400*a* providing IEEE 1588+SyncE support using two PHYs and two MACs. Optical module 400*a* includes an optics block 402, optical logic 404, and a White Rabbit logic block 406*a* supporting IEEE 1588+SyncE White Rabbit profiles. White Rabbit logic block 406*a* includes a first PHY block 408 a first MAC block 410 with timestamping support, a second MAC block 412, and a second PHY block 414. White Rabbit logic block 406*a* also includes a SyncE clock recover logic 416, SyncE clock filtering logic 418, and a management unit 420 which may include or be coupled to memory (not shown). As shown, the receive path 422 is from optical logic 404 to PHY block 408 to MAC block 410 to MAC block 412 to PHY block 414. The transmit path 424 is the reverse of this, beginning at PHY block 414 to MAC block 412 to MAC block 410 to PHY block 408 to optical logic 404.

Under one implementation of optical module 400*a*, a timestamp is added by MAC block 410 to the preamble going to Ethernet device 109 such that the preamble contains the arrival time of each packet, allowing the Ethernet device to know the exact arrival time of each packet. Likewise details about the packet transmission could be sent in the preamble (such as by adding or updating a timestamp in the packet preamble somewhere along transmit path 424).

FIG. 4*b* shows an optical module 400*b* that further includes support for In-Band Network Telemetry (INT). As shown, most of the logic and blocks in FIGS. 4*a* and 4*b* have the same reference numbers and, accordingly, have similar structures and perform similar functions. In addition to this logic and blocks, a White Rabbit logic block 406*b* further includes an INT packet buffer update block 426 interposed between MAC blocks 410 and 412 and an INT statistics (stats) block 428.

Packet buffer 426 may be used to store the packet, update the packet, pace the transmission/reception of the packet, etc. In the case of INT, the arrival or departure time could be updated in the packet which may or may not change the packet size depending on implementation. This may cause the CRC, checksums and/or other packet contents to be modified, either in the buffer or on the fly as the packet passes through the update logic.

Generally, INT stats block 428 may be configured to collect INT statistics that may be used for various purposes. Examples could be arrival and departure time through the switch or latency from the SERVER to the Optical module attached to a NIC or optical module. Other states could include packet counts, byte counts, etc. This could be based on traffic class, VLANs, or data parsed from the packet as exemplary and non-limiting examples. INT stats block 428 may employ various counters based on one or more of VSI, SWITCH ID, per subscriber (e.g. identified using unique ID for host driver), VLAN, traffic class, packet type (e.g., Unicast/multicast/mirror), errors, recirculation etc. INT Stats block 428 can update packet metadata fields based on various events and send the periodic counter notifications to software.

Optical Module with IEEE 1588+SyncE+MACsec Support

Figure 4C:
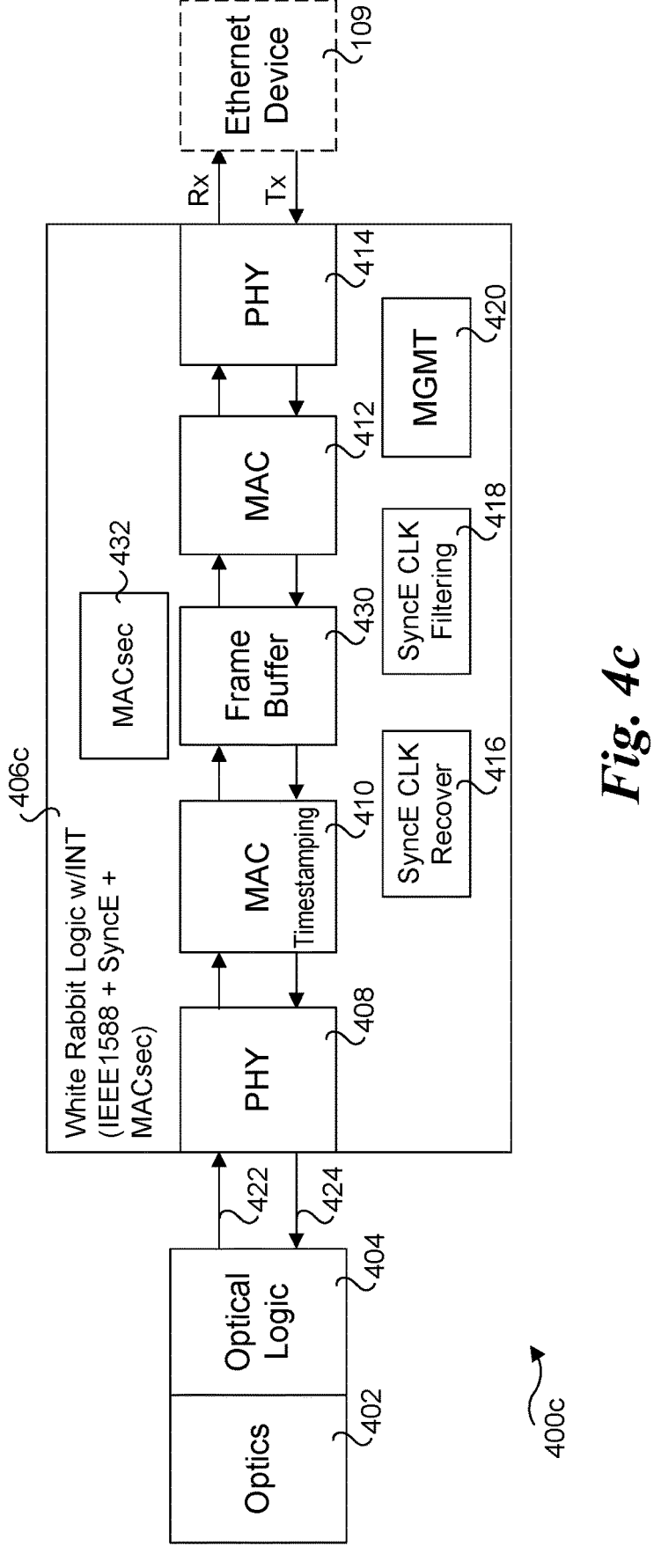
FIG. 4c is a diagram illustrating an optical module configured to support IEEE 1588 plus SyncE plus further includes support for the MACsec protocol, according to one embodiment.

FIG. 4c shows an optical module 400c that further includes support for MACsec. MACsec is a security protocol defined by the IEEE 802.1AD standard. MACsec employs integrity check data for Ethernet frames by appending 8-byte header and the 16-byte tail to the Ethernet frame and adding/storing integrity check data derived from the Ethernet frame content. MACsec devices are configured to implement various aspects of IEEE 802.1AD, including setup and teardown of MACsec connections.

As before, most of the logic and blocks in FIG. 4c have the same reference numbers as shown in FIGS. 4a and 4b and, accordingly, have similar structures and perform similar functions. In addition to this logic and blocks, a White Rabbit logic block 406c further includes a frame buffer 430 interposed between MAC blocks 410 and 412 and an a MACsec block 432 configured to implement MACsec operations in accordance with IEEE 802.1AD.

In some embodiments, a packet buffer may be needed if the packet size changes. For example, when a security header is added or removed. Likewise, security information may need to be parsed from the packet data or metadata (which could be in the preamble) to operate correctly.

For outbound Ethernet frames, the frame is buffered in frame buffer 430, where an 8-byte header and 16-byte tail are added. Integrity check data is calculated for the frame and written to the 8-byte header and 16-byte tail, with the modified Ethernet frame being forwarded to MAC block 410. For inbound Ethernet frames, the integrity check data are read from the 8-byte header and 16-byte tail and are used to confirm the integrity of the Ethernet frames. Frames that pass the integrity check are then forwarded to MAC block 412. As an option, the 8-byte header and 16-byte tail are stripped from the forwarded Ethernet frame.

In addition to MACsec, a similar approach may be used to apply to various security, encryption, decryption, etc. protocol.

Generally, in the embodiments illustrated in FIGS. 3a, 3b, and 4a-4c the PHY and MAC blocks may be combined into a PHY/MAC block or a MAC/PHY block. In addition, other circuitry may be combined or modified to support additional features and/or functionality. For example, a packet or frame buffer may be used to support other features as packets or frames are being processed and forwarded via optical modules. For instance, a Flexible Packet Parser (FXP) type block could be added to perform statistics and other tasks. Packet encapsulation/decapsulation could also be performed. In addition to packet parsing, other FXP tasks like metering could be performed. As yet another option, logic for implementing packet pacing may be implemented. For example, an FXP block may be used to indicate the pacing or departure time of packets.

Another feature that could be added is circuitry to the phase detection method that White Rabbit uses in the Rx direction to measure the phase difference between the recovered clock and the TIME_REF clock. For example, White Rabbit uses a DDMTD (digital dual mixer time difference).

Figure 5:
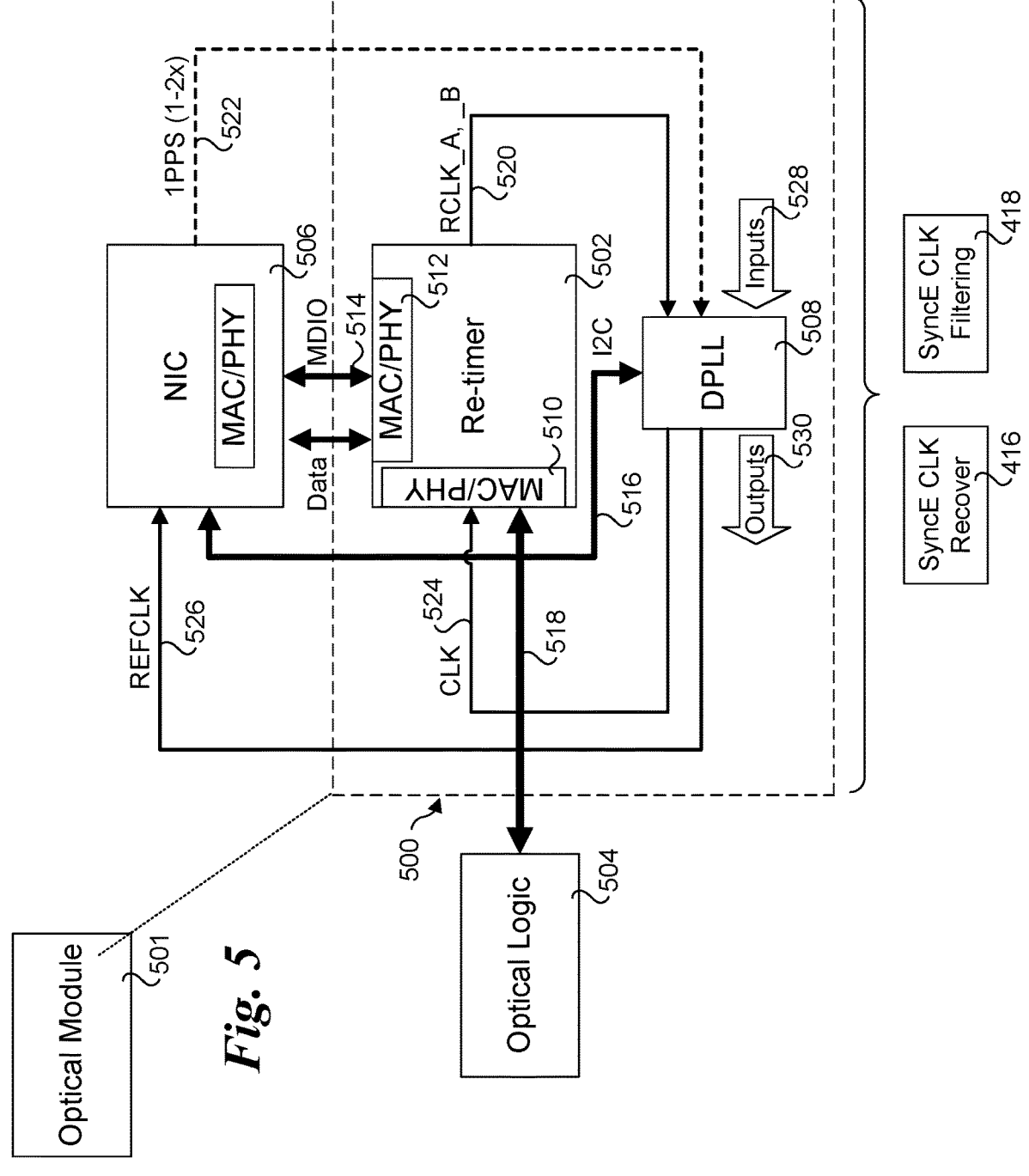
FIG. 5 is a diagram illustrating circuitry for implementing SyncE recover and filter blocks, according to one embodiment.

FIG. 5 shows circuitry 500 for implementing SyncE operations, according to one embodiment. Circuitry 500 includes a re-timer block 502, and a Digital Phase Lock Loop (DPLL) 508. Re-timer block 502 includes a MAC and PHY blocks (or a combined MAC/PHY block) along with a MAC/PHY interface 510 and a MAC/PHY interface 512. MAC/PHY interface 512 is connected to a NIC chip 506 including a MAC/PHY via a Management Data Input/ Output (MDIO) link 514, also known as Serial Management Interface (SMI) or Media Independent Interface Management (MIIM) link. NIC chip 506 is connected to DPLL 508 via multiple signal paths including an I2C bus 516. In the case where the optics are part of a switch SOC or multichip module, NIC chip 506 and MAC/PHY interface 512 may be combined to reduce latency, power, area, pin count, etc.

Input signals from optical logic 504 are received over a bidirectional link 518 by re-timer block 502 at MAC/PHY interface 510. As its name implies, circuitry in re-timer block 502 is used to re-time the received signals. The re-timer circuitry outputs received clocks A and B (depicted as RCLK_A, _B signals 520, which are received on the input side of DPPL 508. MC Chip 506 outputs an 1PPS reference signal 522 that is also received as an input to DPLL 508. Meanwhile, DPLL 508 outputs two clock signals: a CLK signal 524 that is received by re-timer block 502 and a reference clock (REFCLK) signal 526 that is received by MC Chip 506. In addition to the inputs and outputs shown and described above, DPLL 508 may also receive other inputs 528 and output other outputs 530.

Figure 5A:
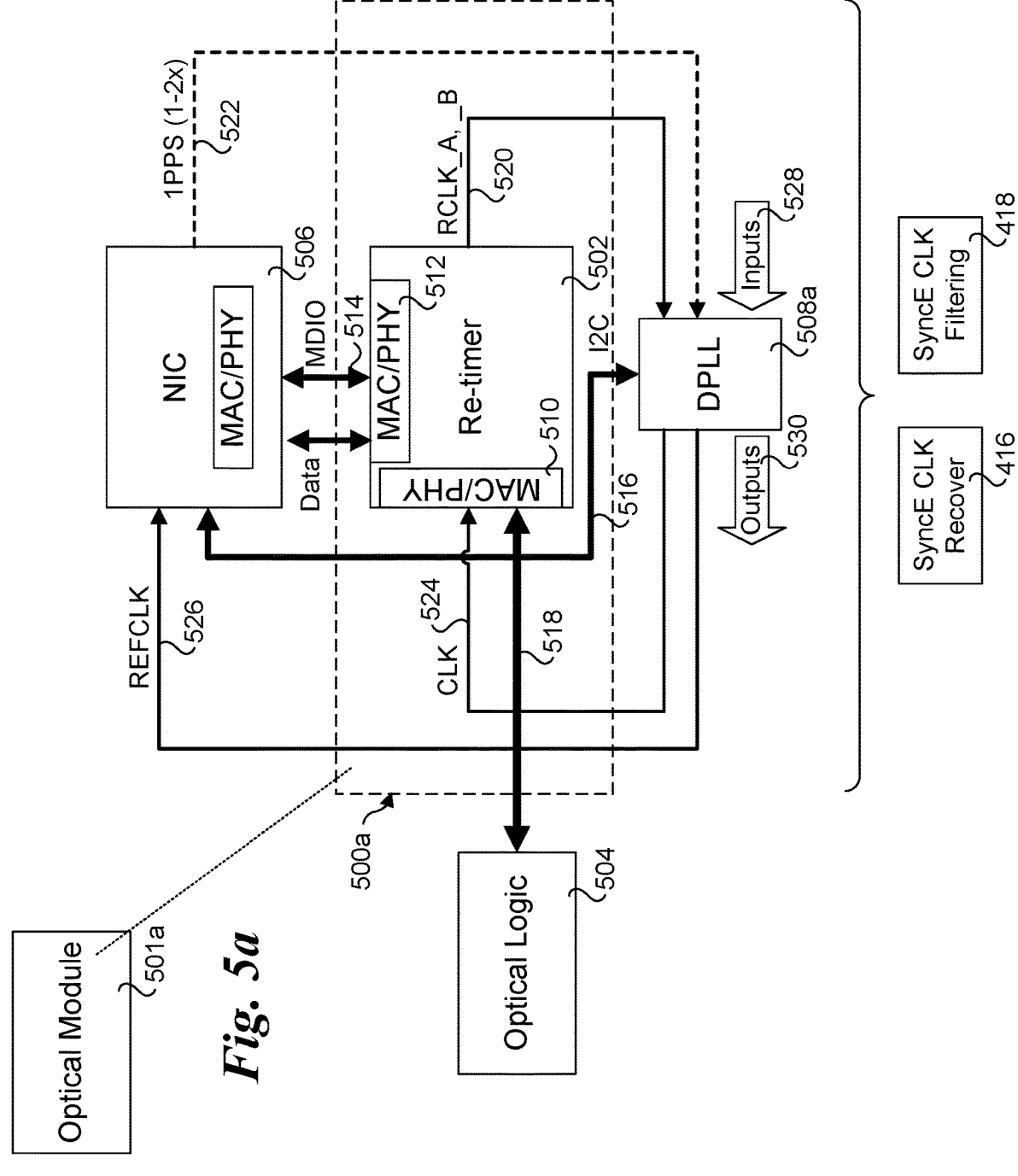
FIG. 5a is a diagram illustrating an alternative circuit configuration for implementing SyncE recover and filter blocks wherein the DPLL is implemented in a chip that is separate from the optical module, according to one embodiment.

As depicted by the dashed box in FIG. 5, circuitry 500 is part of an optical module 501, which is generally representative of any of the optical module embodiments, described herein that includes the SyncE feature. As an alternative, a DPLL may be separate from the optical module, such as shown in FIG. 5a. In this embodiment, the circuitry within dashed box 500a is implemented in optical module 501a, while DPLL 508a is a separate chip that is installed on a circuit board to which optical module 501 is coupled. In one embodiment, DPLL 508a is a Microchip Technology® ZL30632 chip, which is a two-channel SyncE network synchronizer. In one embodiment, a single DPLL chip is used for two optical modules.

Quad Small Form Factor Pluggable (QSFP) and QSFP+ Modules

Quad Small Form Factor Pluggable (QSFP) modules are hot-pluggable optical modules that employ four transceiver channels rather than one. QSFP+ modules similarly support four transceiver channels, but generally operate at high transmission speeds than QSPF modules. They are designed to support multi-channel and or multi-"lane" high speed Ethernet links, such as 40 GB links employing 4×10 GB lanes or channels. The principles and teachings disclosed in the embodiments discussed and illustrated herein can be extended to QSFP and QSFP+ modules (or any other existing or future multi-port and or multi-lane optical modules). In the case of multiple lanes, there would be replicated circuitry for the optical block and optical logic blocks along the receive and transmit paths described and illustrated herein, as would be recognized by those skilled in the art.

Generally, features such as IEEE 1588 PTP, SyncE, one-step, INT stats, etc. are applicable for flows of packets and related processing/timing/statistics etc. Thus, a single set of circuitry would be employed for both single lane and multi-lane links (rather than employing replicated circuitry for each lane). In cases where the White Rabbit logic "listens" to one or both of the receive and transmit paths, the listening could be for a single lane or may be done after the optical logic block (such as shown in FIG. 1). Similarly in the multiport module cases, a single set of White Rabbit logic could listen to more than one port, or separate sets of white rabbit logic could be on a per port bases.

An advantage of implementation the enhanced circuitry in a multi-port module is that it can save power, and area. This is because the circuitry may be implemented in the same silicon device, removing the need for redundant circuitry.

Generally, features such as IEEE 1588 PTP, SyncE, one-step, INT stats, etc. are applicable for flows of packets and related processing/timing/statistics etc. Thus, a single set of circuitry would be employed for both single lane and multi-lane links (rather than employing replicated circuitry for each lane). In cases where the White Rabbit logic "listens" to one or both of the receive and transmit paths, the listening could be for a single lane or may be done after the optical logic block (such as shown in FIG. 1).

Pluggable Electrical Module with IEEE 1588 PTP

The White Rabbit logic and related functionality may also be implemented in pluggable electrical modules. A primary difference between the pluggable electrical modules and the optical modules (which also may be pluggable) is the signal processing in the pluggable electrical modules remains entirely within the electrical domain, whereas optical modules employ signal processing in both the optical domain and the electrical domain, as discussed above.

Figure 6:
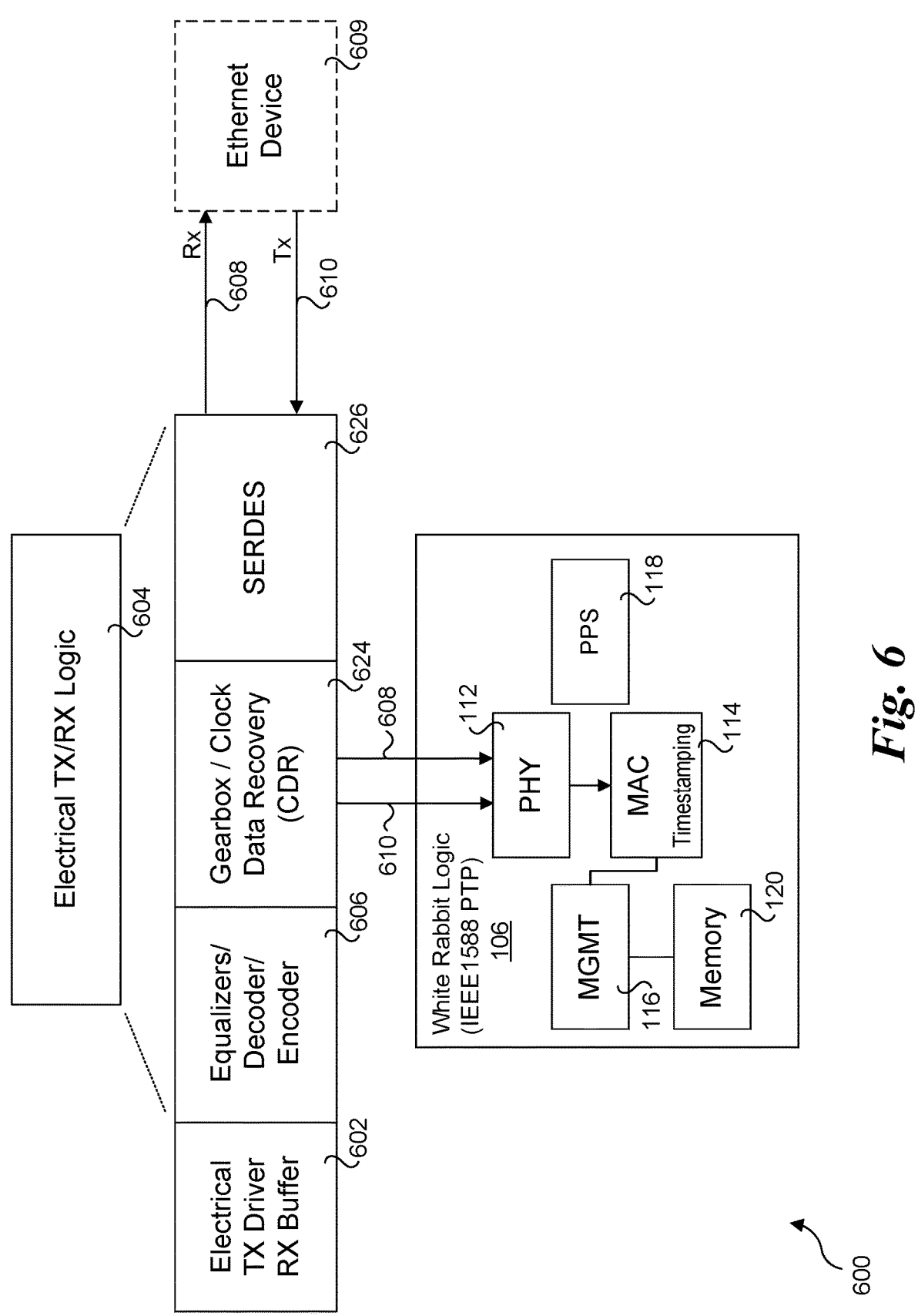
FIG. 6 is a diagram of a pluggable electrical module configured to support the White Rabbit IEEE 1588 PTP profile, according to one embodiment.

FIG. 6 shows an embodiment of an pluggable electrical module 600, which includes an electrical TX driver and RX driver block 602 coupled to electrical TX/RX logic 604. Electrical TX/RX logic 604 includes an equalizers/decoder/encoder block 606, a gearbox/CDR block 624, and a SERDES block 626. Pluggable electrical module 600 further includes an Rx datapath 608 and a Tx datapath 610 coupled between SERDES 626 and an Ethernet device 609. Similar to described and illustrated for the optical module embodiments above, the Rx and Tx datapaths also pass through electrical TX/RX logic 604 including gearbox/CDR block 624.

As further shown, White Rabbit logic block 106 comprises the same circuitry shown in FIGS. 1 and 1a and discussed above. In a manner similar to that shown in FIG. 1a and discussed above, circuitry in White Rabbit logic block 106 would listen to signal transmitted over Rx datapath 608 and/or Tx datapath 610. Those signals would be processed by PHY block 112, and MAC block 114 using PPS block 118 in the manner described above to add timestamps to inbound and/or outbound packets, packet preambles, or Ethernet frames.

Pluggable Electrical Module with IEEE 1588 PTP+SyncE

Figure 7:
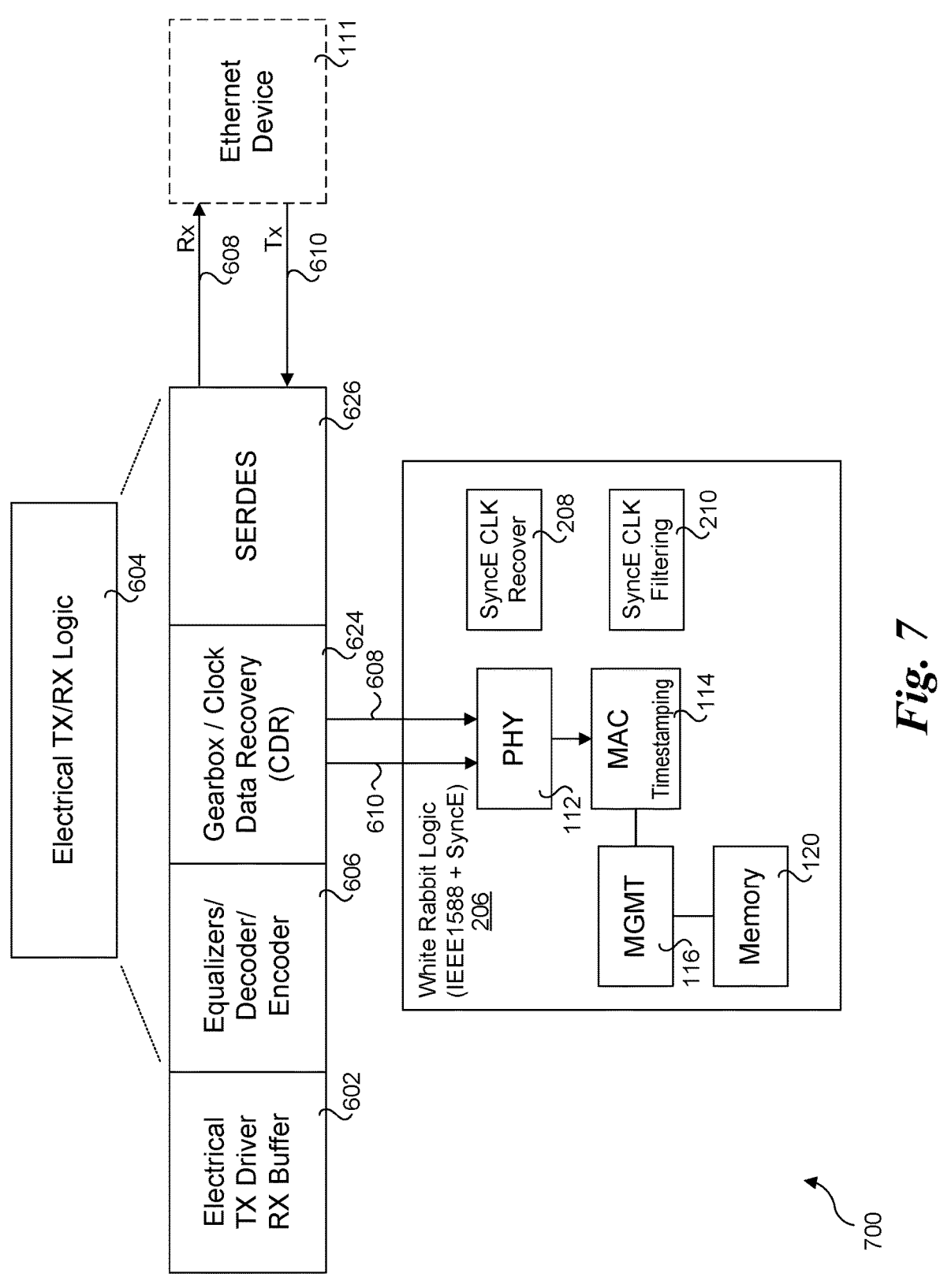
FIG. 7 is a diagram of a pluggable electrical module configured to support the White Rabbit IEEE 1588 PTP profile plus provide SyncE support, according to a first embodiment.

FIG. 7 show a pluggable electrical module 700 which includes White Rabbit logic block 206 that is configured to implement IEEE 1588 PTP and SyncE according to a White Rabbit profile in the IEEE1588-2019 standard. As illustrated by like-numbers blocks in FIGS. 6 and 7, the electrical components in the upper portion of both diagrams is the same. White Rabbit logic block 206 employs the same or similar components to that shown in FIGS. 2 and 2a and described above. In this case, White Rabbit logic block 206 listens to signals on one or both of Rx datapath 608 and Tx datapath 610.

Pluggable Electrical Modules with IEEE 1588 One-Step Support

IEEE 1588 supports one-step and two-step clocks. Under one-step, for a PTP event message the timestamp is placed in the message/packet on-the-fly using hardware. Under two-step, the timestamp is added to a separate message/packet. The following embodiments add support for IEEE 1588 one-step.

Figures 8A, 8B:
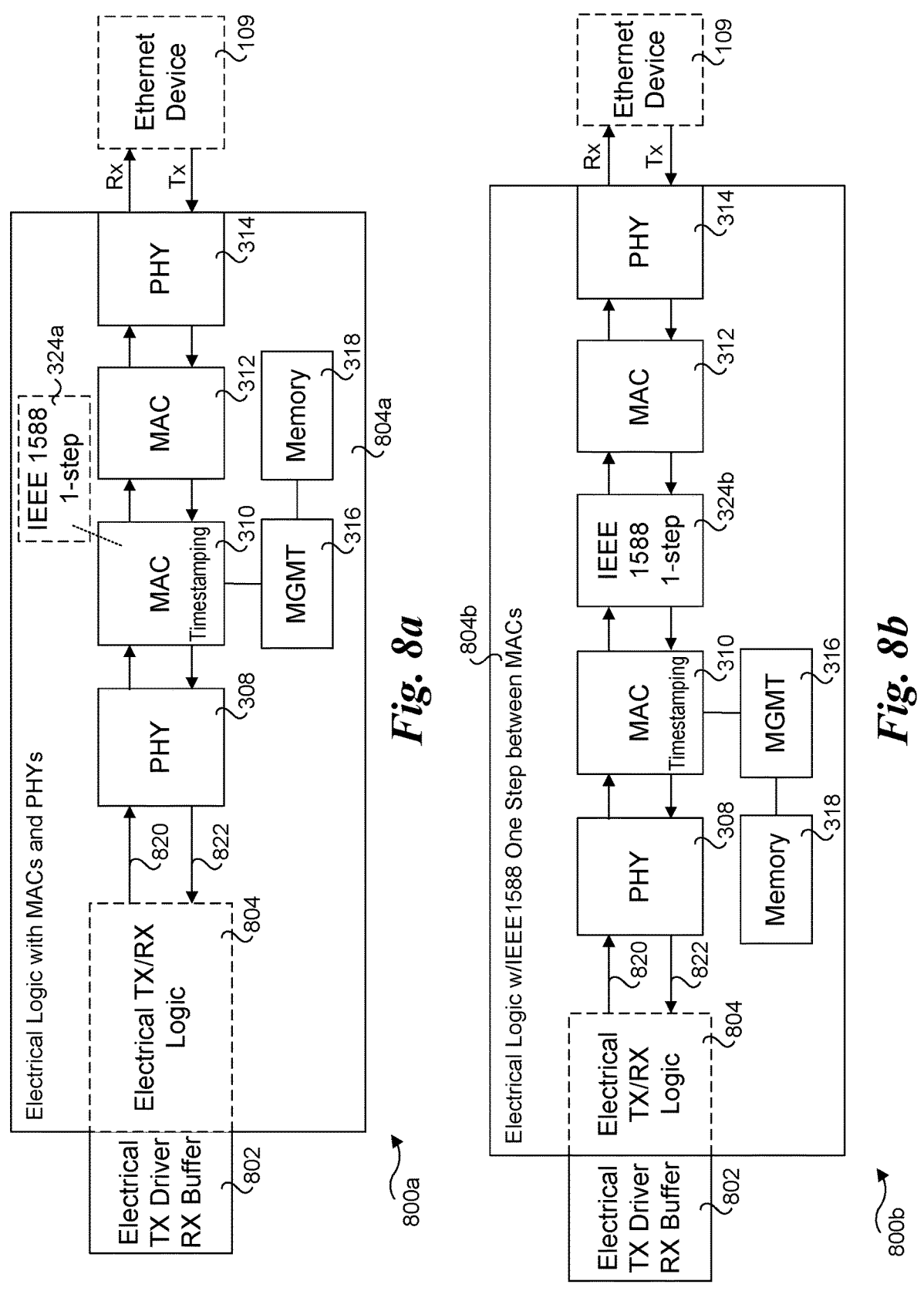
FIG. 8a is a diagram illustrating a first embodiment of a pluggable electrical module including optical logic for implement IEEE 1588 one-step operations.
FIG. 8b is a diagram illustrating a second embodiment of a pluggable electrical module including optical logic for implement IEEE 1588 one-step operations.

FIGS. 8a and 8b shows pluggable electrical modules 800a and 800b that are configured to provide IEEE 1588 one-step support. Pluggable electrical module 800a includes an electrical TX drive and RX buffer block 802 coupled to electrical logic with MACs and PHYs 804a, which includes electrical TX/RX logic 804 that is similar to TX/RX logic 604 shown in FIGS. 6 and 7 and employs a Rx datapath 820 and a Tx datapath 822. The remainder of the circuitry in electrical logic with MACs and PHYs 804a is similar to circuitry shown in optical logic block 304a of FIG. 3a, where like-numbered blocks and components are similar for both embodiments.

Pluggable electrical module 800b in FIG. 8b includes an electrical logic block 804b that supports IEEE 1588 one-step. Electrical logic block 804b is similar to optical logic block 304b shown in FIG. 3b, except original optical logic 306 is replaced with electrical TX/RX logic 804. As before, IEEE 1588 one-step block 324b is interposed between MAC blocks 310 and 312, and is configured to perform time-stamping and associated IEEE 1588 one-step operations.

Pluggable Electrical Modules with IEEE 1588+SyncE+Support

Figures 9A, 9B:
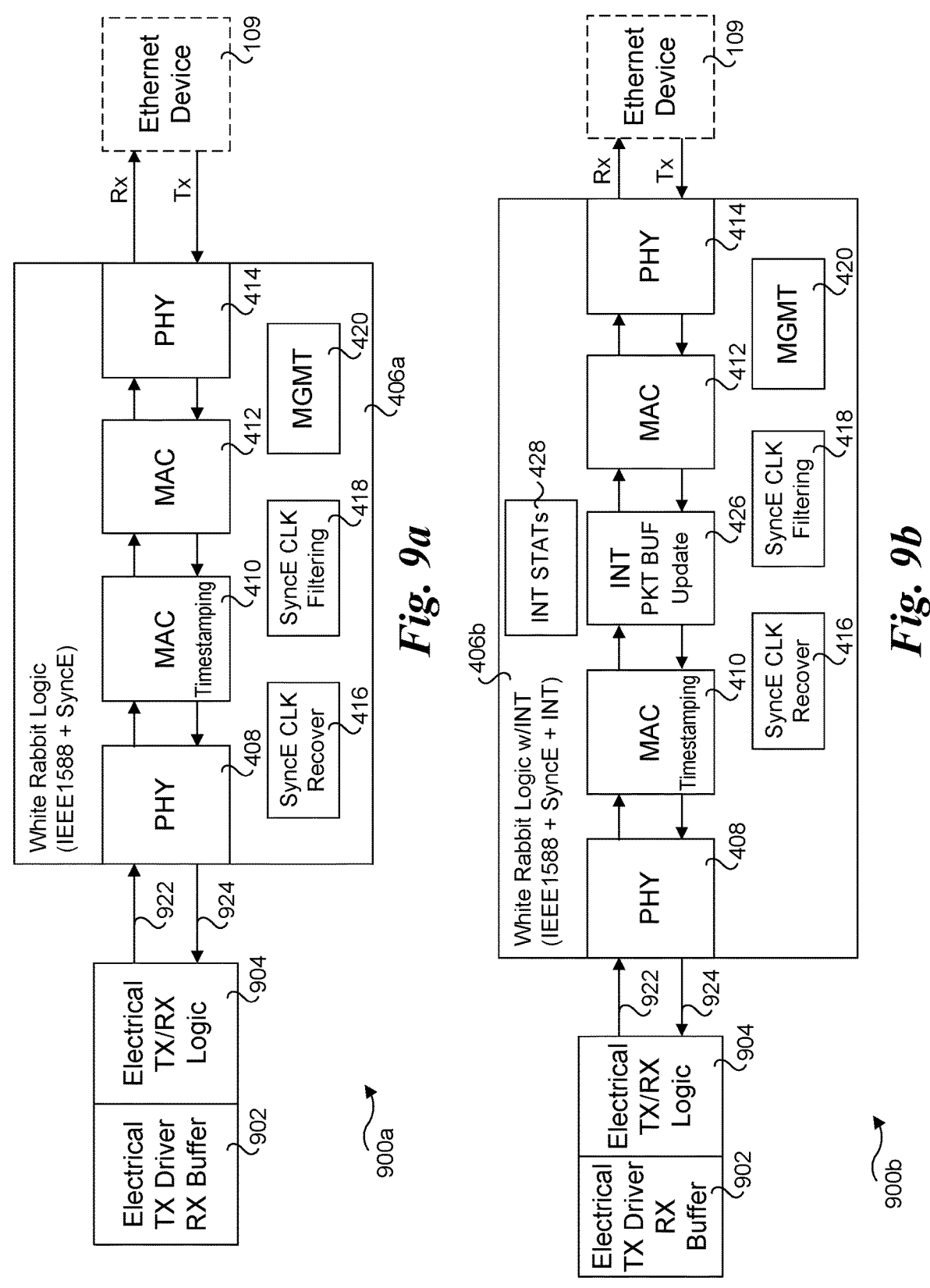
FIG. 9a is a diagram illustrating a pluggable electrical module configured to support the White Rabbit IEEE 1588 PTP profile plus provide SyncE support, according to a second embodiment.
FIG. 9b is a diagram illustrating a pluggable electrical module configured to support IEEE 1588 plus SyncE plus further includes support for In-Band Network Telemetry (INT), according to one embodiment.
Figure 9C:
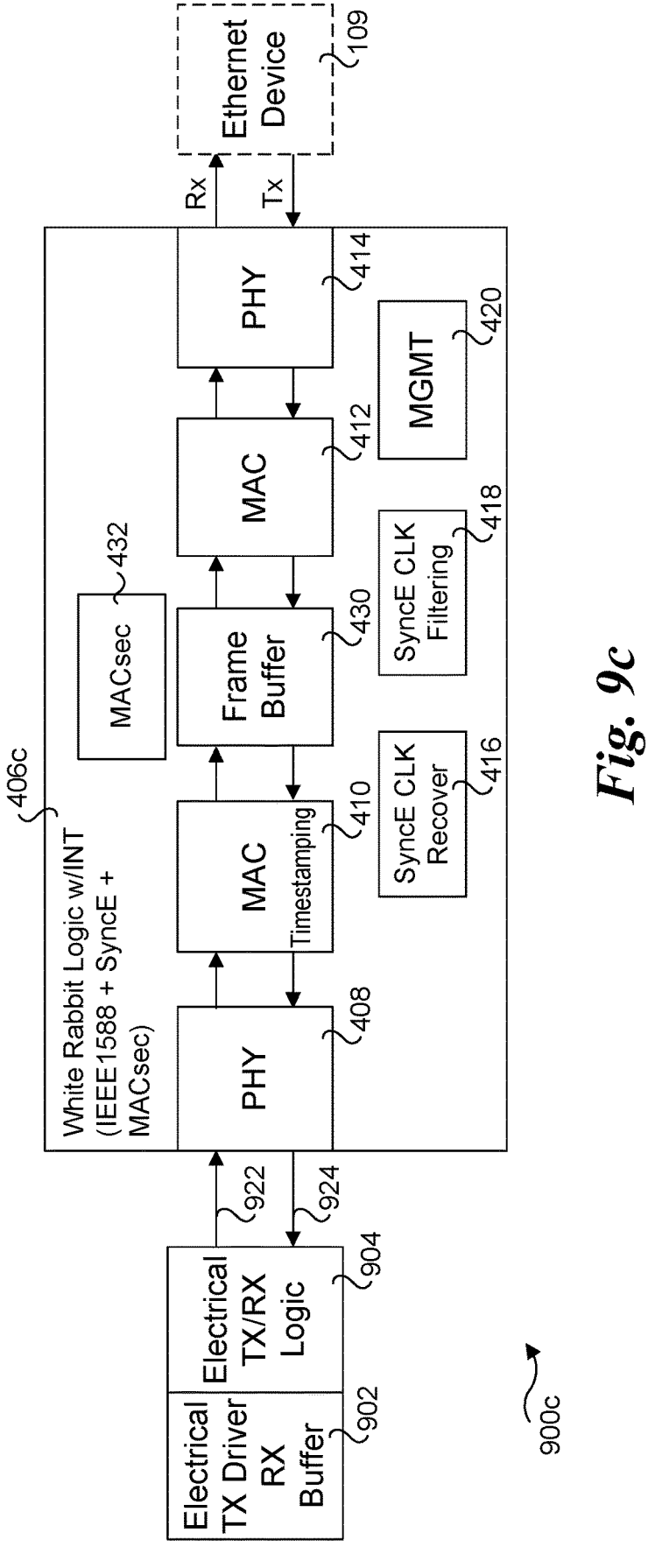
FIG. 9c is a diagram illustrating a pluggable electrical module configured to support IEEE 1588 plus SyncE plus further includes support for the MACsec protocol, according to one embodiment.

FIGS. 9a, 9b, and 9c respectively show pluggable electrical modules 900a, 900b, and 900c which respectively include IEEE 1588+SyncE support, IEEE 1588+SyncE+INT support, and IEEE 1588+SyncE+MACsec support. As shown by like-numbered blocks and components in FIGS. 9a, 9b, and 9c and respective FIGS. 4a, 4b, and 4c, the same White Rabbit logic blocks 406a, 406b and 406c are used in both the pluggable electrical modules and the optical modules. For the pluggable electrical module embodiments, these White Rabbit logic blocks are connected to an electrical TX driver RX buffer block 902 and electrical TX/RX logic 904 via signals transmitted over an Rx datapath 922 and a Tx datapath 924.

Exemplary Use Cases

Figure 10:
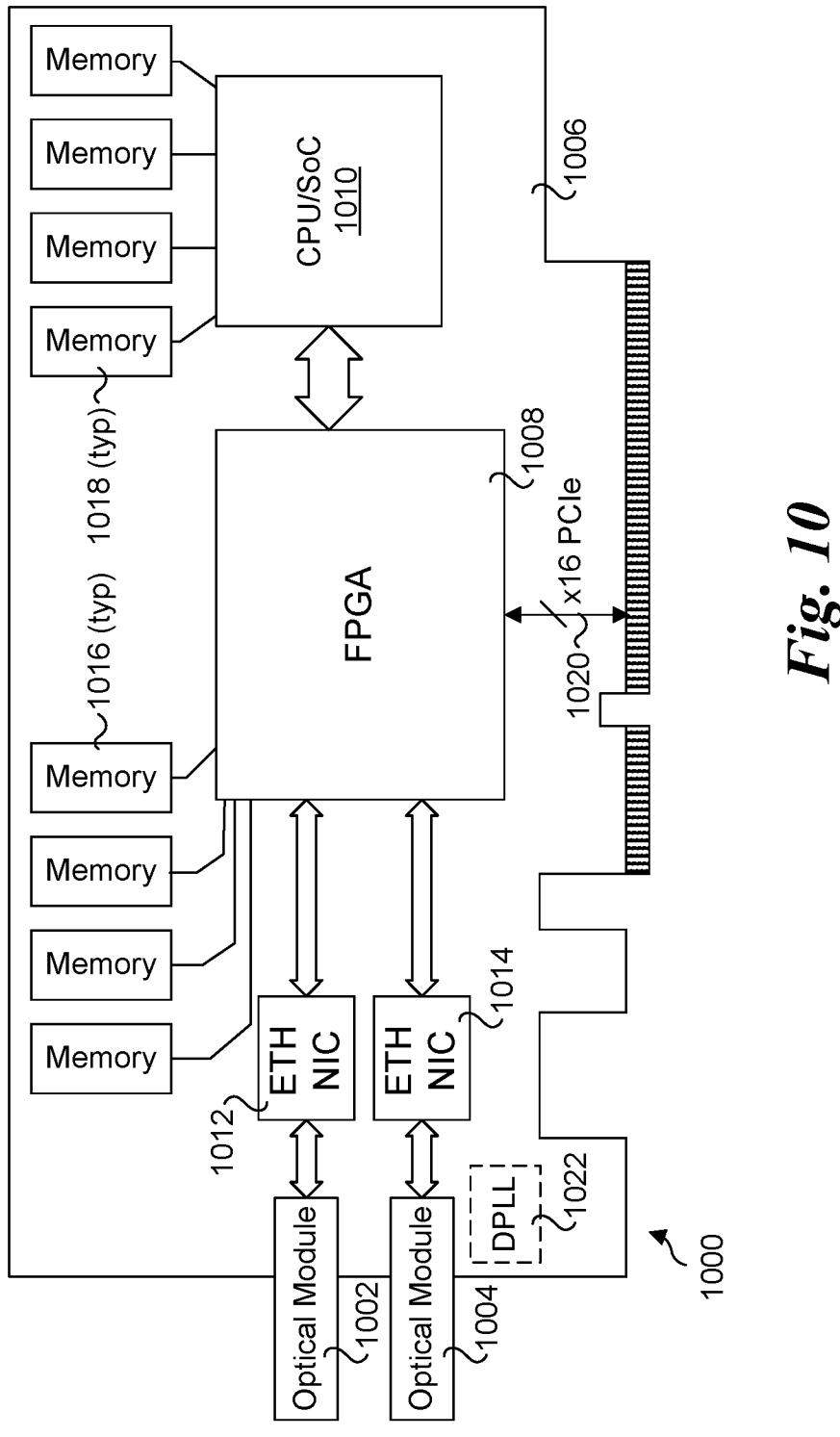
FIG. 10 is schematic diagram of a first exemplary IPU including two enhanced optical modules, according to one embodiment.
Figure 10A:
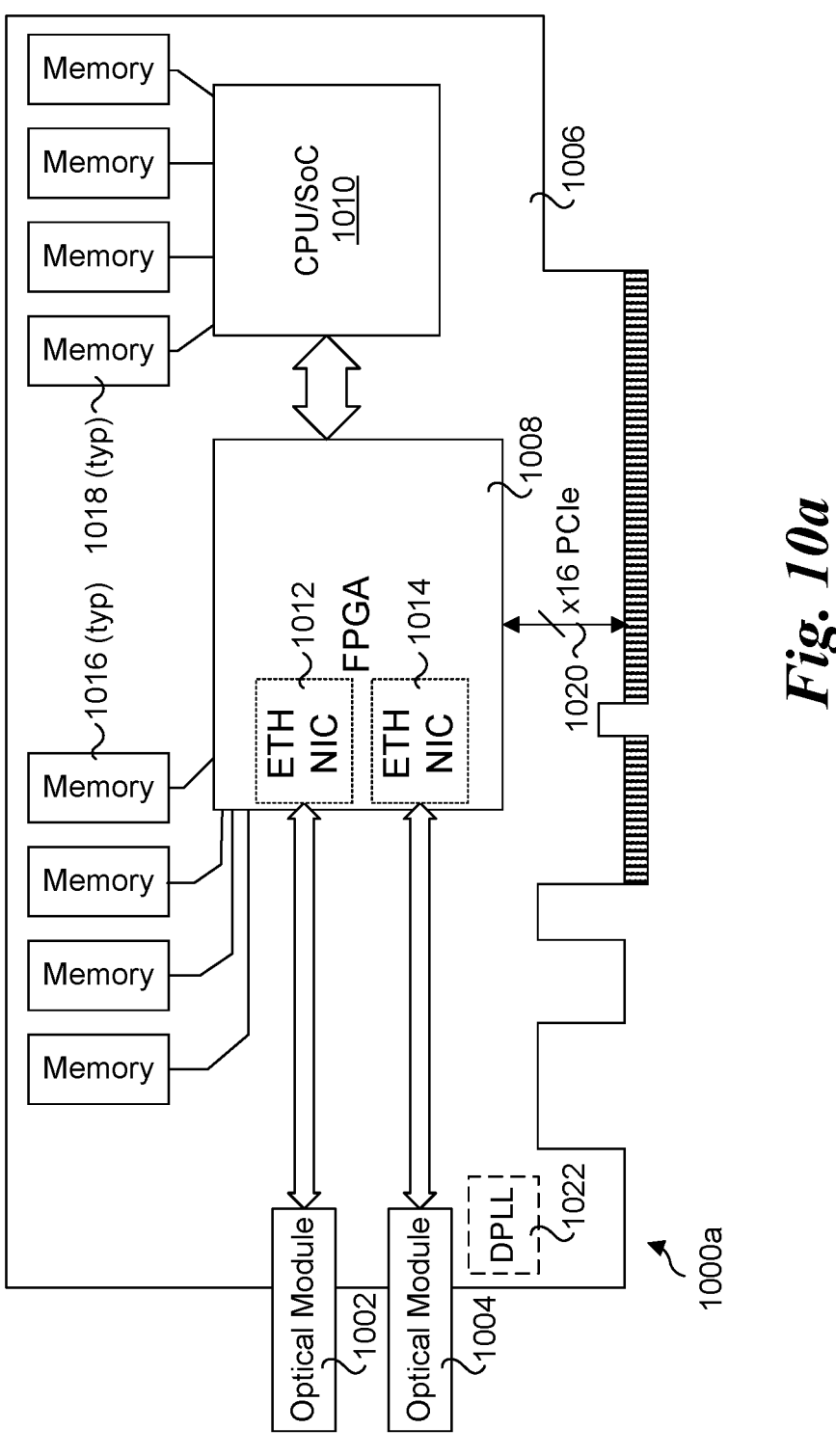
FIG. 10a is a schematic diagram illustrating a second exemplary IPU including two enhanced optical modules, wherein the Ethernet NIC functionality is implemented in the FPGA.

FIGS. 10 and 10a shows respective infrastructure processor units (IPUs) 1000 and 1000a, each including two enhanced optical modules 1002 and 1004. In the illustrated embodiment of FIG. 10, IPU 1000 comprises a Peripheral Component Interconnect Express (PCIe) card including a circuit board 1006 having a PCIe edge connector to which various integrated circuit (IC) chips and enhanced optical modules 1002 and 1004 are mounted. The IC chips include an FPGA 1008, a CPU/SoC (System on a Chip) 1010, a pair of Ethernet NICs 1012 and 1014, and memory chips 1016 and 1018. Programmed logic in FPGA 1008 and/or execution of software on CPU/SoC 1010 may be used to implement various IPU functions. FPGA 1008 may include logic that is pre-programmed (e.g., by a manufacturing) and/or logic that is programmed in the field. For example, logic in FPGA 1008 may be programmed by a host CPU for a platform in which IPU 1000 is installed. IPU 1000 may also include other interfaces (not shown) that may be used to program logic in FPGA 1008. Under an optional configuration, a DPLL chip 1022 is used for re-timer and SyncE operations, such as illustrated in FIG. 5a and discussed above. Under an IPU 1000a shown in FIG. 10a, the functionality associated with Ethernet NICs 1012 and 1014 is implemented in FPGA 1008 by (pre-) programming associated logic in the FPGA. Optionally, similar functionality may be implemented using an ASIC or an SOC.

CPU/SoC 1010 employs a System on a Chip including multiple processor cores. Various CPU/processor architectures may be used, including x86 and ARM architectures. In one non-limiting example, CPU/SoC 1006 comprises an Intel® Xeon® processor. Software executed on the processor cores may be loaded into memory 1018, either from a storage device (not shown), for a host, or received over a network coupled to enhanced optical module 1002 and 1004.

Figure 11:
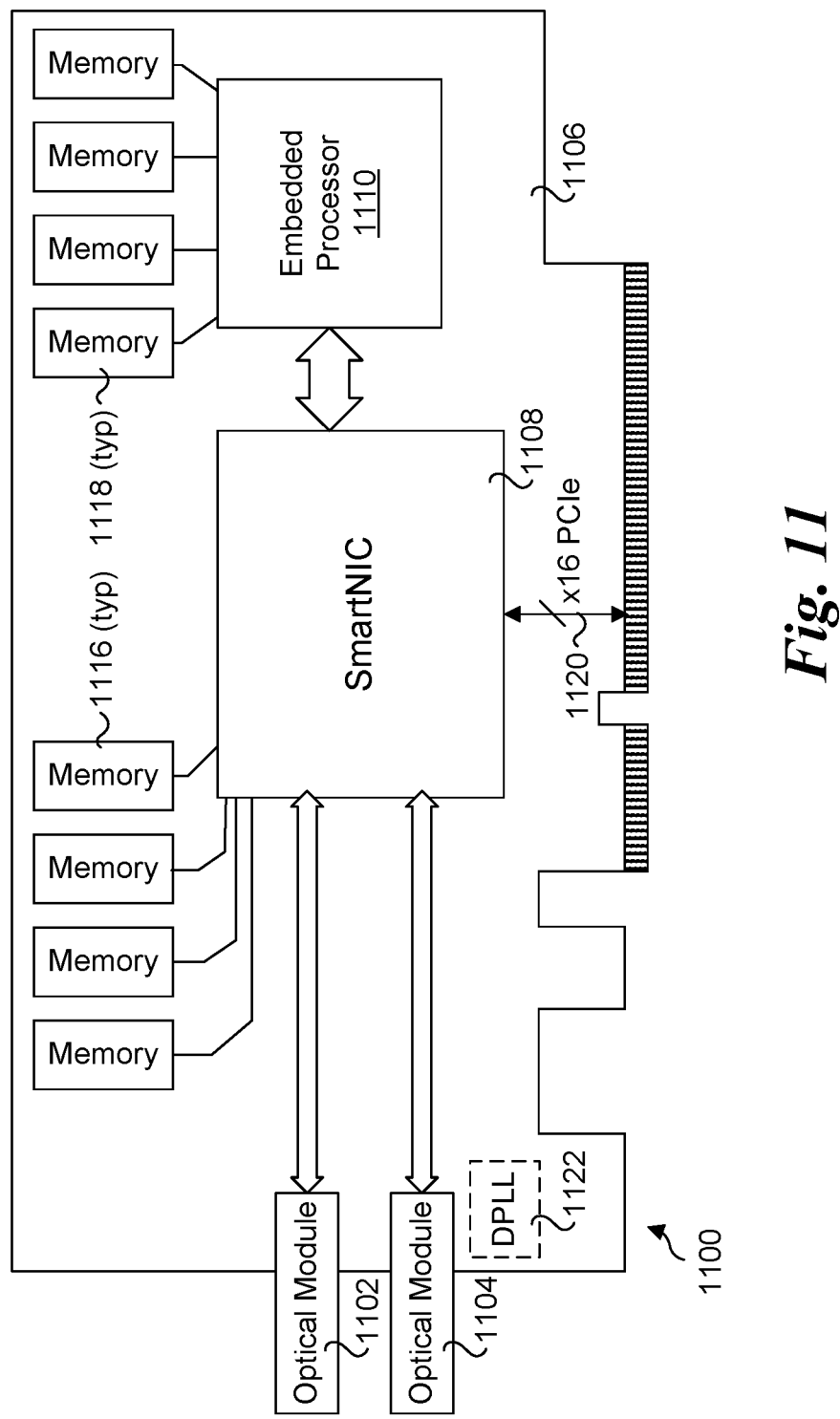
FIG. 11 is a schematic diagram illustrating a smartNIC including two enhanced optical modules.

FIG. 11 shows a SmartNIC 1100 including a pair of enhanced optical modules 1102 and 1104. SmartNIC 1100 comprises a Peripheral Component Interconnect Express (PCIe) card including a circuit board 1106 having a PCIe edge connector to which various integrated circuit (IC) chips and enhanced optical modules 1102 and 1104 are mounted. The IC chips include an SmartNIC chip 1108, an embedded processor 1110 and memory chips 1116 and 1118. SmartNIC chip 1108 is a multi-port Ethernet NIC that is configured to perform various Ethernet NIC functions, as is known in the art. In some embodiments, SmartNIC chip 1108 is an FPGA and/or includes FPGA circuitry. SmartNIC chip 1108 may include embedded logic for performing various packet processing operations, such as but not limited to packet classification, flow control, RDMA (Remote Direct Memory Access) operations, an Access Gateway Function (AGF), Virtual Network Functions (VNFs), a User Plane Function (UPF), and other functions.

Figure 12:
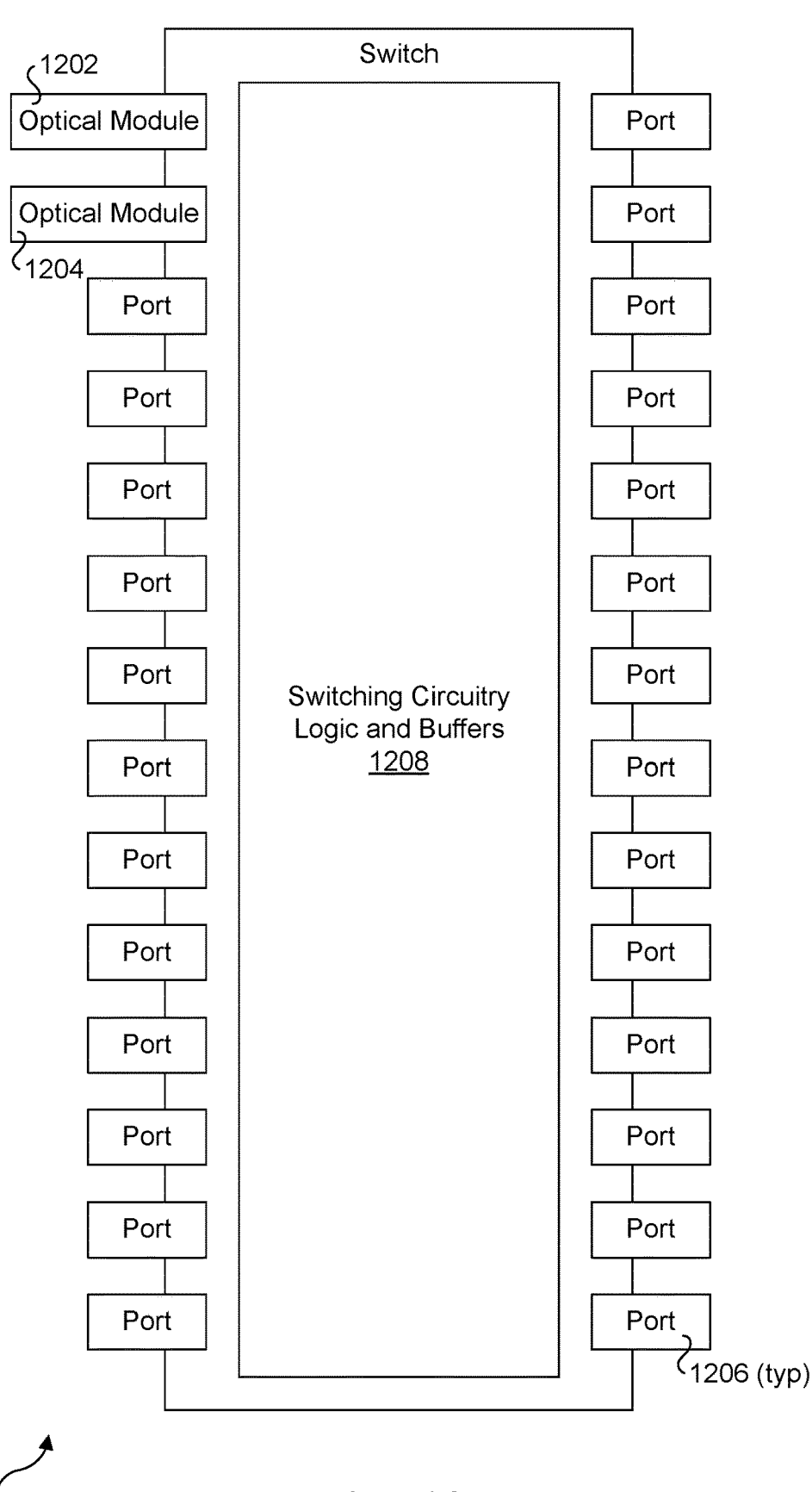
FIG. 12 is a schematic diagram of a switch including two enhanced optical modules.

In addition to IPUs and SmartNICs, the optical modules described and illustrated herein generally may be used with various devices that have one or more Ethernet ports. Examples of such devices include but are not limited to line cards, switches routers, cellular equipment (like nano-cells, picocells, ethernet connected radios), WiFi equipment, network appliances, storage devices, security devices, servers with Ethernet ports, telecom equipment, and test equipment, An example of a switch 1200 including enhanced optical modules 1202 and 1204 is shown in FIG. 12. Switch 1200 includes multiple switch ports 1206 and switching circuitry, logic, and buffers 1208, which is generally representative of circuitry implemented in switches, such as but not limited to Top of Rack (ToR) switches and other types of switches. In one embodiment, optical modules 1202 and 1204, which also comprise two of the switch ports, are used for uplink connections to an optical network. Generally, ports 1206 may employ either wired or optical communication. Optical ports may employ conventional optical modules, in addition to one or more optical modules with enhanced features.

Generally, enhanced optical modules 1002 and 1004, 1102, 1104, 1202 and 1204 represent any of the embodiments of optical modules described and illustrated herein. Depending on the requirements of a system, an optical module may include one or more of the features and enhancements described and illustrated herein.

The embodiments of advanced optical modules and pluggable electrical modules disclosed herein provide several advantages over existing approaches. Significantly, they provide a mechanism for adding precise time measurements and associated time parameters (e.g., using SyncE) to existing equipment by simply replacing the existing optical modules with new advanced optical modules. This applies to both equipment in the field and new equipment being manufactured—these capabilities can be added without changes to silicon and with generally minor changes to firmware (to take advantage of the new features and capabilities). A vendor or end-user may also update capabilities over time, if so desired, or mix and match capabilities. For example, a given end-user or customer may want to add MACsec to some of its equipment, while adding White Rabbit IEEE 1588 PTP with or without SyncE to other equipment, while add the combination of capabilities to yet other equipment. From a vendor standpoint, the same board hardware could be deployed to support multiple use cases, again, by simply providing different advanced optical modules with the boards. This is in comparison to current approaches, where adding these capabilities requires new silicon (e.g., new NIC chips). In addition, unlike many optical modules, which are pluggable, most NIC chips are fixedly bounded to their circuit boards (e.g., using solder balls or the like).

In addition to the circuitry and apparatus illustrated and described herein, a 1PPS reference single(s) may be supplied by a separate component not separately shown in the Figures or provided by one or the components illustrated in the drawings. Moreover, other frequencies may be used, such as but not limited to 10 KHz. For example, such a reference signal may be implemented in FPGA 1008 in FIGS. 10 and 10A, SmartNIC chip 1108 in FIG. 11, and switching circuitry logic in FIG. 12.

In the foregoing embodiments the terms "PHY" and "MAC" are used; however, this terminology is not meant to limiting, as circuitry performing similar functions that are not called PHY and MAC may also be used. For example, such functions include converting between a physical analog signal domain to a digital domain under which data (such as data in packets, preamble, frames, etc.) may be manipulated. Thus, timestamps may be added/updated in the digital domain.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An optical module, having a receive path and a transmit path and comprising:
    an optics block; and
    optical logic comprising a first Physical Layer (PHY) block coupled to a first MAC (Media Access Control) block, a second MAC block coupled to a second PHY block, and circuitry supporting an IEEE (Institute of Electrical Engineers and Electronics) 1588 Precision Time Protocol (PTP) profile one-step operation integrated in at least one of the first and second MAC blocks or in a block disposed between the first and second MAC blocks,
    wherein the optical logic is configured to add a timestamp or update a timestamp in a packet or a packet preamble in conjunction with forwarding the packet or packet preamble along at least one of the receive path and the transmit path using an IEEE 1588 one-step operation.

2. The optical module of claim 1, wherein the PTP profile comprises a White Rabbit IEEE 1588 PTP profile.

3. The optical module of claim 1,
    wherein the receive path includes the first PHY block to the first MAC block to the second MAC block to the second PHY block, and wherein the transmit path includes the second PHY block to the second MAC block to the first MAC block to the first PHY block, and
    wherein in conjunction with forwarding a packet along at least one of the receive path and transmit path, a timestamp is added to the packet or packet preamble as part of the IEEE 1588 one-step operation.

4. The optical module of claim 1,
    wherein the receive path includes the first PHY block to the first MAC block to the IEEE 1588 one-step logic block to the second MAC block to the second PHY block, and wherein the transmit path includes the second PHY block to the second MAC block to the IEEE 1588 one-step logic block to the first MAC block to the first PHY block, and
    wherein in conjunction with forwarding a packet along at least one of the receive path and transmit path, a timestamp is added to the packet or packet preamble as part of the IEEE 1588 one-step operation.

5. The optical module of claim 1, wherein the circuitry in the optical logic is configured to support a White Rabbit IEEE 1588 with Ethernet Synchronous Clocks (SyncE) profile, and wherein the circuitry further comprises SyncE clock recover logic and SyncE filtering logic.

6. The optical module of claim 5, wherein the optical logic further includes circuitry for implementing In-Band Network Telemetry (INT) comprising:
    an INT packet buffer interposed between the first and second MAC blocks; and
    an INT statistics block;
    wherein the receive path includes the first PHY block to the first MAC block to the INT packet buffer to the second MAC block to the second PHY block, and wherein the transmit path includes the second PHY block to the second MAC block to the INT packet buffer to the first MAC block to the first PHY block,
    wherein the INT packet buffer and INT statistics block are configured to collect network telemetry data for at least one or inbound packets and outbound packets.

7. The apparatus of claim 5, wherein the SyncE clock recover logic and SyncE filtering logic includes a retimer block communicatively coupled to a MAC/PHY block that is communicatively coupled to a digital phase lock loop (DPLL) block or chip.

8. The optical module of claim 1, wherein the optical logic further includes circuitry for implementing a MACsec protocol defined by IEEE standard 802.1AD, comprising:
    a packet buffer interposed between the first and second MAC blocks; and
    a MACsec block;
    wherein the receive path includes the first PHY block to the first MAC block to the packet buffer to the second MAC block to the second PHY block, and wherein the transmit path includes the second PHY block to the second MAC block to the packet buffer to the first MAC block to the first PHY block, and
    wherein in conjunction with forwarding an Ethernet frame along the transmit path MACsec integrity check data is added to the Ethernet frame.

9. A method implemented using an optical module including a receive path and transmit path and including circuitry supporting a Precision Time Protocol (PTP) profile and circuitry for implementing In-Band Network Telemetry (INT), the method comprising:
    determining a precise current time using the circuitry supporting the PTP profile;
    one of adding or updating a timestamp in a packet or packet preamble with the precise current time that is determined in conjunction with forwarding the packet or packet preamble along the receive path or transmit path;

collecting network telemetry data for at least one or inbound packets and outbound packets in conjunction with forwarding the packets along at least one of the receive path and the transmit path; and performing statistical analysis on the network telemetry data that are collected.

10. The method of claim 9, wherein the PTP profile comprises a White Rabbit IEEE (Institute of Electrical Engineers and Electronics) 1588 PTP profile.

11. The method of claim 9, wherein the optical logic further comprises circuitry supporting an IEEE (Institute of Electrical Engineers and Electronics) 1588 one-step operation, further comprising:

adding or updating the timestamp for packet or packet preamble as part of the IEEE 1588 one-step operation.

12. The method of claim 9, wherein the optical logic further comprises circuitry for implementing a White Rabbit IEEE (Institute of Electrical Engineers and Electronics) 1588 with Ethernet Synchronous Clocks (SyncE) profile, further comprising generating SyncE signals to be used by a device in which the optical module is installed.

13. The method of claim 9, wherein the optical logic further includes circuitry for implementing security operations in accordance with a MACsec protocol defined by IEEE (Institute of Electrical Engineers and Electronics) standard 802.1AD, further comprising:

adding MACsec integrity check data to an Ethernet frame as the Ethernet frame is being forwarded via the transmit path.

14. An apparatus comprising:

an Ethernet device, operatively coupled to a circuit board; and an optical module, operatively coupled to the circuit board and having a receive path via which signals are processed and forwarded to the Ethernet device and a transmit path via which signals originating from the Ethernet device are processed and forwarded, the optical module further including, an optics block; and optical logic comprising a first Physical Layer (PHY) block coupled to a first MAC (Media Access Control) block, a second MAC block coupled to a second PHY block, and circuitry supporting an IEEE (Institute of Electrical Engineers and Electronics) 1588 Precision Time Protocol (PTP) profile one-step operation integrated in at least one of the first and second MAC blocks or in a block disposed between the first and second MAC blocks, wherein the optical logic is configured to add a timestamp or update a timestamp in packet or a packet preamble in conjunction with forwarding the packet or packet preamble along at least one of the receive path and the transmit path using an IEEE 1588 one-step operation.

15. The apparatus of claim 14, wherein the optical logic includes circuitry for implementing In-Band Network Telemetry (INT), and the optical module is further configured to:

collect network telemetry data for at least one or inbound packets and outbound packets in conjunction with forwarding the packets along at least one of the receive path and the transmit path; and perform statistical analysis on the network telemetry data that are collected.

16. The apparatus of claim 14, wherein the apparatus comprises an Infrastructure Processing Unit (IPU) or a Network Interface Controller.

17. The apparatus of claim 14, wherein the optical module comprises a first optical module, wherein the apparatus comprises a switch including a second optical module having a configuration similar to the first optical module, wherein the switch includes a plurality of ports operatively connected to switching circuitry, and wherein two of the plurality of ports respectively employ the first and second optical modules.

* * * * *